（12） United States Patent
Bovington

(10) Patent No.: US 11,960,154 B2
(45) Date of Patent: Apr. 16, 2024

(54) THERMAL ISOLATION ELEMENT

(71) Applicant: Cisco Technology, Inc., San Jose, CA (US)

(72) Inventor: Jock T. Bovington, Koenigstein im Taunus (DE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/821,067

(22) Filed: Aug. 19, 2022

(65) Prior Publication Data

US 2022/0404649 A1 Dec. 22, 2022

Related U.S. Application Data

(60) Continuation of application No. 17/302,905, filed on May 14, 2021, now Pat. No. 11,467,434, which is a division of application No. 16/597,682, filed on Oct. 9, 2019, now Pat. No. 11,042,049.

(51) Int. Cl.
  *G02F 1/01* (2006.01)
  *G02B 6/138* (2006.01)
  *G02B 6/12* (2006.01)

(52) U.S. Cl.
  CPC .......... *G02F 1/0147* (2013.01); *G02B 6/138* (2013.01); *G02B 2006/121* (2013.01)

(58) Field of Classification Search
  None
  See application file for complete search history.

(56) References Cited

U.S. PATENT DOCUMENTS 10,209,539 B1 * 2/2019 Doerr ...................... G02F 1/011
2019/0004342 A1 * 1/2019 Iida ....................... G02F 1/0147

* cited by examiner

Primary Examiner — Chad H Smith
(74) Attorney, Agent, or Firm — Patterson + Sheridan, LLP

(57) ABSTRACT

Thermal isolation elements are provided in wafer-bonded silicon photonics that include a photonic platform, including a heating element and an optical waveguide that are disposed between a first surface and a second surface (opposite to the first surface) of the photonic platform; a substrate, including a third surface and a fourth surface (opposite to the third surface); wherein the first surface of the photonic platform is bonded to the third surface of the substrate; and wherein a cavity is defined by a trench in one or more of: the first surface and extending towards, but not reaching, the second surface, and the third surface and extending towards, but not reaching, the fourth surface; wherein the cavity is filled with a gas of a known composition at a predefined pressure; and wherein the cavity is aligned with the optical waveguide and the heating element.

20 Claims, 33 Drawing Sheets

THERMAL ISOLATION ELEMENT

CROSS-REFERENCE TO RELATED APPLICATIONS

This application is a continuation of U.S. divisional patent application Ser. No. 17/302,905, filed on May 14, 2021, which claims benefit of U.S. patent application Ser. No. 16/597,682, filed Oct. 9, 2019 which issued on Jun. 22, 2021 as U.S. Pat. No. 11,042,049. The aforementioned related patent applications are herein incorporated by reference in their entirety.

TECHNICAL FIELD

Embodiments presented in this disclosure generally relate to fabricating silicon photonics. More specifically, embodiments disclosed herein provide for the production of silicon photonic devices that include thermal isolation elements.

BACKGROUND

Thermal phase shifters are a valuable element in photonic integrated circuits (PIC), which have the capacity to achieve significant phase shifts in most semiconductor materials, while not imparting additional loss to the optical signals carried therein. Thermal phase shifters, however, due to thermal impedances in the materials of the photonic platform, can be less energy efficient and slower to react than opto-electronic phase shifters. Efforts to improve energy efficiency and reaction times in thermal phase shifters have resulted in fragile PICs, increased device complexity, or tradeoffs in one of energy efficiency or reaction time.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
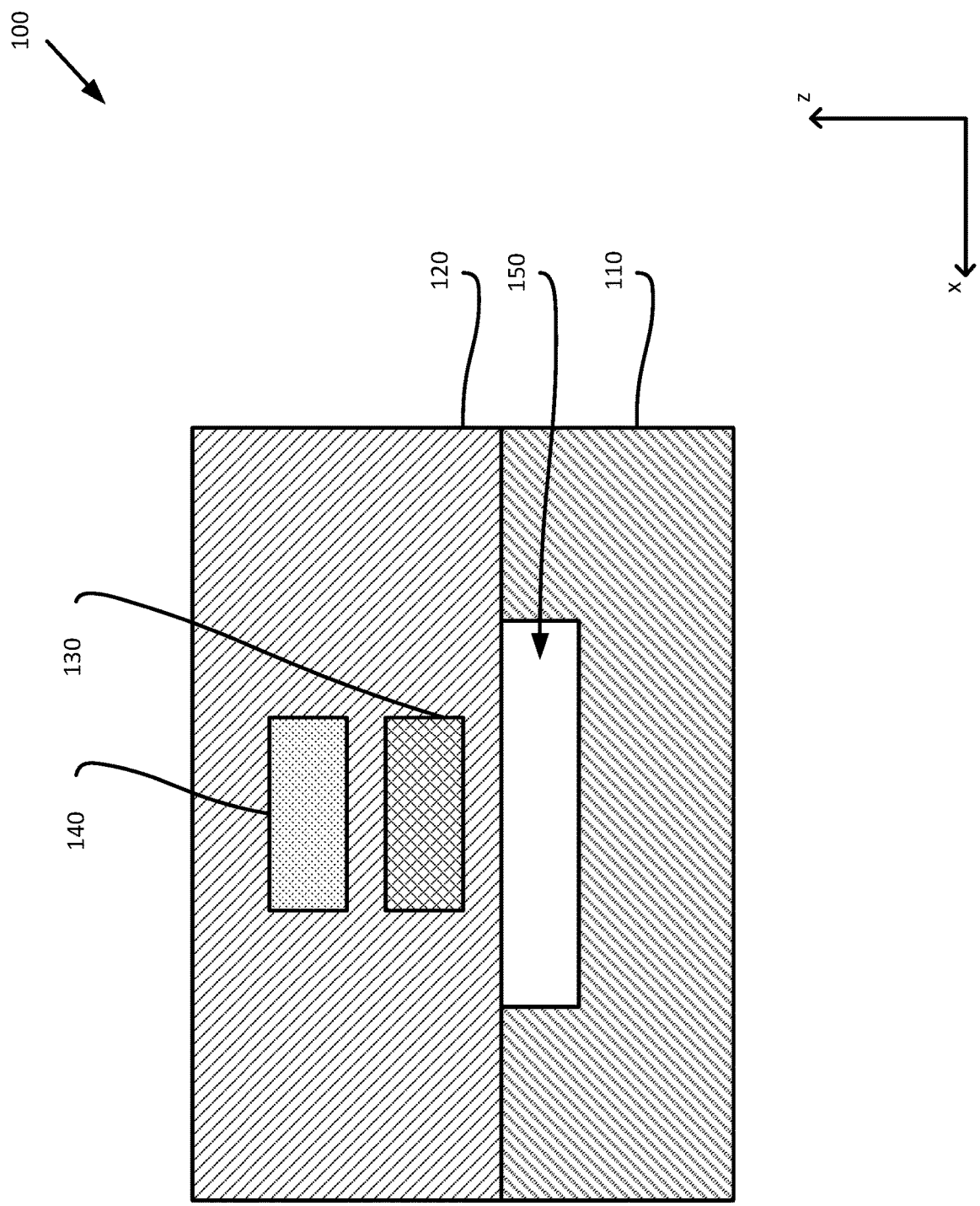
FIGS. 1A-1D illustrate opto-electronic devices in which a trench defining the cavity is formed in the bulk material of a substrate, according to embodiments of the present disclosure.

One embodiment presented in this disclosure provides a method for fabricating silicon photonic devices with thermal isolation elements, the method comprising: identifying a region on a first surface of a photonic platform, the photonic platform comprising a heating element and an optical waveguide within a dielectric; removing the region to produce a trench in the first surface of the photonic platform; and bonding the first surface of the photonic platform to a second surface of a substrate to define an airtight cavity with the trench and the substrate, wherein the airtight cavity contains a predefined atmosphere at a predefined pressure.

One embodiment presented in this disclosure provides a method for fabricating silicon photonic devices with thermal isolation elements, the method comprising: identifying a region on a first surface of a substrate; removing the region to produce a trench in the first surface of the substrate; and bonding the first surface of the substrate to a second surface of a photonic platform that includes a heating element and an optical waveguide encased in a dielectric to define an airtight cavity with the trench and the second surface, wherein the airtight cavity contains a predefined atmosphere at a predefined pressure.

One embodiment presented in this disclosure provides a silicon photonic device with thermal isolation elements fabricated therein, the device comprising: a photonic platform, including a heating element and an optical waveguide disposed between a first surface and a second surface, opposite the first surface, of the photonic platform; a substrate, including a third surface and a fourth surface, opposite the third surface; wherein the first surface of the photonic platform is bonded to the third surface of the substrate; and wherein a cavity is defined by a trench in one or more of: the first surface and extending towards, but not reaching, the second surface, and the third surface and extending towards, but not reaching, the fourth surface; wherein the cavity is filled with a gas of a known composition at a predefined pressure; and wherein the cavity is aligned with the optical waveguide and the heating element.

Example Embodiments

The present disclosure provides for photonic integrated circuits (PICs) with thermal isolation elements to increase the thermal impedance of the thermal phase shifters without making the proposed thermal phase shifter or PIC brittle or fragile. The resulting PIC is mechanically stable and physically robust, and the thermal impedance properties may be locally altered at various regions of the PIC to allow for fine-tuned control of the thermal impedances across the PIC.

The thermal isolation elements may be used in the localized temperature control of a PIC for control of optical filters used in wavelength division multiplexing and local oscillator alignment, optical radio frequency (RF) filtering, athermalization of lasers and (de)multiplexers, etc.

A lithographically defined trench is formed on one or more of a photonic element and a silicon substrate, which are bonded together to define a thermal insulation element (e.g., a cavity, which may include vacuum or a thermally insulative material) as a thermal isolation element in the assembled opto-electronic device. The lithography process allows the fabricator to define various shapes, lengths, and depths in the material in which the trench is defined. The substrate of the bonded wafer can be removed to change the thermal conductivity for the formed device is improved (e.g., for connection to a heatsink).

FIGS. 1A-1D, FIGS. 2A-2D, and FIGS. 3A-3D illustrate various cross-sections of opto-electronic devices 100 that include a cavity 150 defined according to embodiments of the present disclosure. As will be appreciated, as cross-sections, each of the opto-electronic devices 100 illustrated in FIGS. 1A-1D, FIGS. 2A-2D, and FIGS. 3A-3D may represent different views of the same opto-electronic device 100 or may represent different opto-electronic devices 100.

FIGS. 1A-1D illustrate opto-electronic devices 100 in which a trench defining the cavity 150 is formed in the bulk material of a substrate 110. FIGS. 2A-2D illustrate opto-electronic devices 100 in which a trench defining the cavity 150 is formed in the bulk material of a photonic platform 120. FIGS. 3A-3D illustrate opto-electronic devices 100 in which a trench defining the cavity 150 is formed in the bulk material of a substrate 110 and in the bulk material of a photonic platform 120, or in the bulk material and a surface layer 300 of a substrate 110.

In FIGS. 1A-1D, FIGS. 2A-2D, and FIGS. 3A-3D, the substrate 110 and the photonic platform 120 are separately formed opto-electronic elements, which may be formed by wafer level processes on separate Silicon (Si) wafers, and are bonded together and processed to form the illustrated opto-electronic devices 100. The substrate 110 may be formed from a wafer of a bulk Si material, and may optionally include a surface layer 300 made from a $SiO_2$ or other dielectric material (i.e., a dielectric surface layer) or another interface material to facilitate bonding to the photonic platform 120. The photonic platform 120 includes a dielectric material (e.g., $SiO_2$) in which at least one optical waveguide 130 and at least one heating element 140 are formed.

Optical waveguides 130 confine and direct the path that light travels within the medium of an opto-electronic device 100. The optical waveguides 130 define areas of increased refractive index relative to the optical medium (e.g., $SiO_2$) to direct the light along a desired trajectory. Although discussed herein primarily in regards to optical waveguides 130, a fabricator may define various optical components in the desired trajectory in conjunction with the waveguides 130 that are not illustrated in the present cross sections, such as, for example, mirrors, gratings, lenses, filters, or the like. As illustrated, the optical waveguides 130 carry optical signals into or out of the page, and a photonic platform 120 may include one optical waveguide 130 or multiple optical waveguides (e.g., a first optical waveguide 130a and a second optical waveguide 130b per FIGS. 1C, 2C, and 3C).

The heating element 140 provides an operator or end user of the opto-electronic device 100 the ability to selectively apply an electrical current to induce, via resistance in the heating element 140, a temperature increase in the optical waveguide 130. The heating element 140 may be one of several heating elements (e.g., a first heating element 140a and a second heating element 140b per FIGS. 1B, 1C, 2B, 2C, 3B, and 3C) that may be controlled in tandem or separately to heat one or more optical waveguides 130. The heating element 140 applies a controlled temperature to the associated optical waveguide 130 to affect a phase of the optical signal. In some embodiments, the heating element 140 may be an electro-optic material, such as lithium niobate that is part of a phase shifter assembly.

Each heating element 140 ideally affects only the phase of signals passed through an associated waveguide 130, but in practice, the heat produced from a heating element 140 may radiate throughout the opto-electronic device 100. One or more thermal isolation elements are therefore defined in the material of the opto-electronic device 100 to interrupt the transfer of heat from the heating element 140 away from the associated waveguide 130, thus reducing secondary effects of the heating element 140 on other components of the opto-electronic device 100 and concentrating the primary effects of the heating element 140 on the intended waveguide 130.

The cavity 150 defined within the opto-electronic device 100 is a thermal isolation element that is airtight and includes a known gas at a known pressure. In some embodiments, the cavity 150 contains air at approximately 1 atmosphere (e.g., 101 kiloPascals (kPa)±10%), while in other embodiments, the cavity contains vacuum of a defined pressure (e.g., medium vacuum (3 kPa to 100 mPa±10%) or high vacuum (100 mPa to 10 µPa±10%)), or another known composition of one or more thermally insulative and/or inert gases (e.g., Nitrogen ($N_2$), Sulfur hexafluoride ($SF_6$), Neon (Ne), Argon (Ar), Carbon Dioxide ($CO_2$), CO (Carbon Monoxide)) at a predefined pressure.

FIGS. 1A-1D, FIGS. 2A-2D, and FIGS. 3A-3D provide a non-limiting set of examples of potential arrangements of the waveguides 130, heating elements 140, and cavities 150 and other thermal isolation elements in an opto-electronic device 100. Other components, such as electrical vias and traces defined through the bulk materials, surface mounted wires and circuitry components, alignment features, additional optical elements (e.g., lenses, gratings, filters, mirrors) defined in the bulk materials, and the like may be included in finalized opto-electronic devices 100 or multi-part assemblies that an opto-electronic device 100 is incorporated into.

Figure 1B:
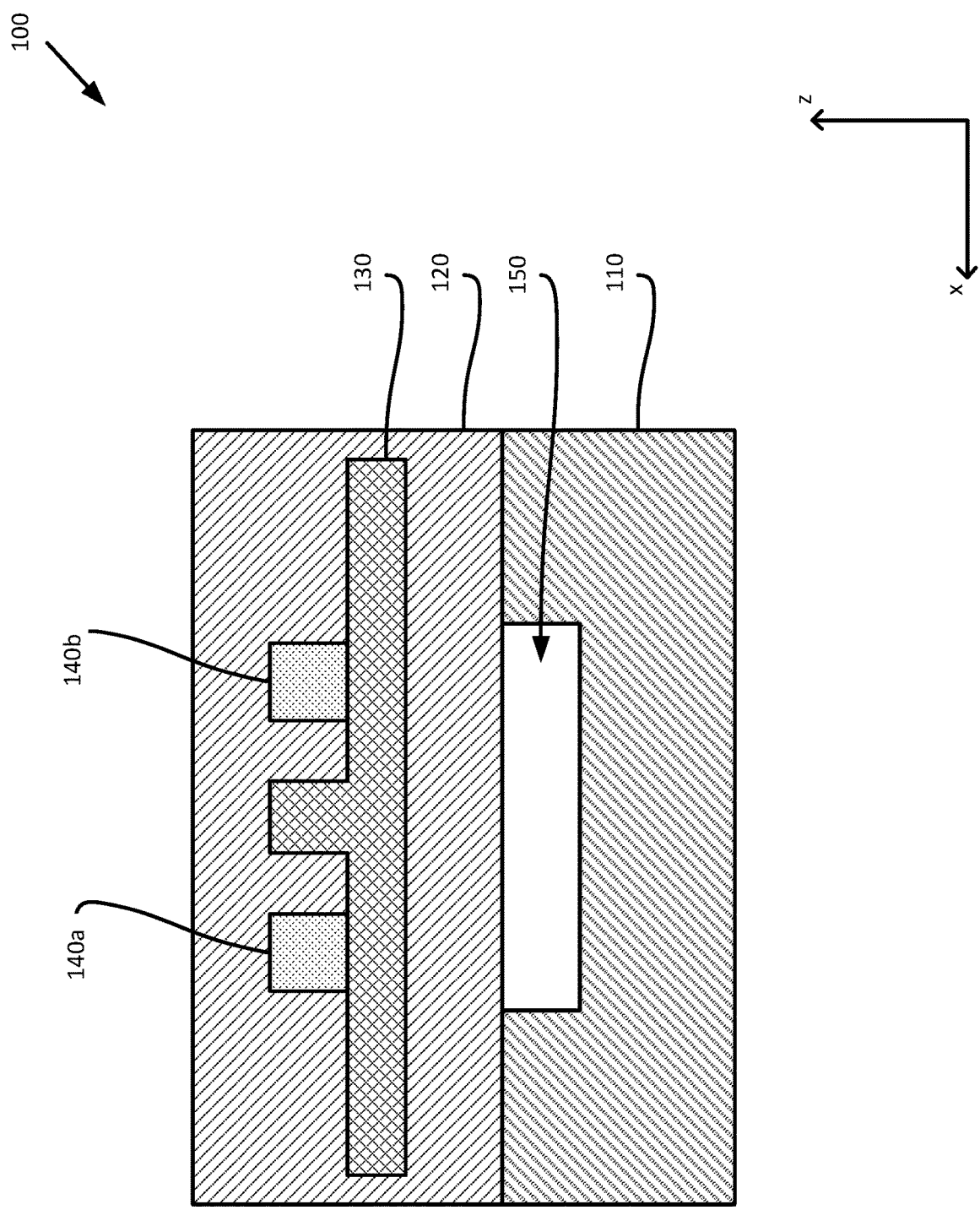
Figure 2A:
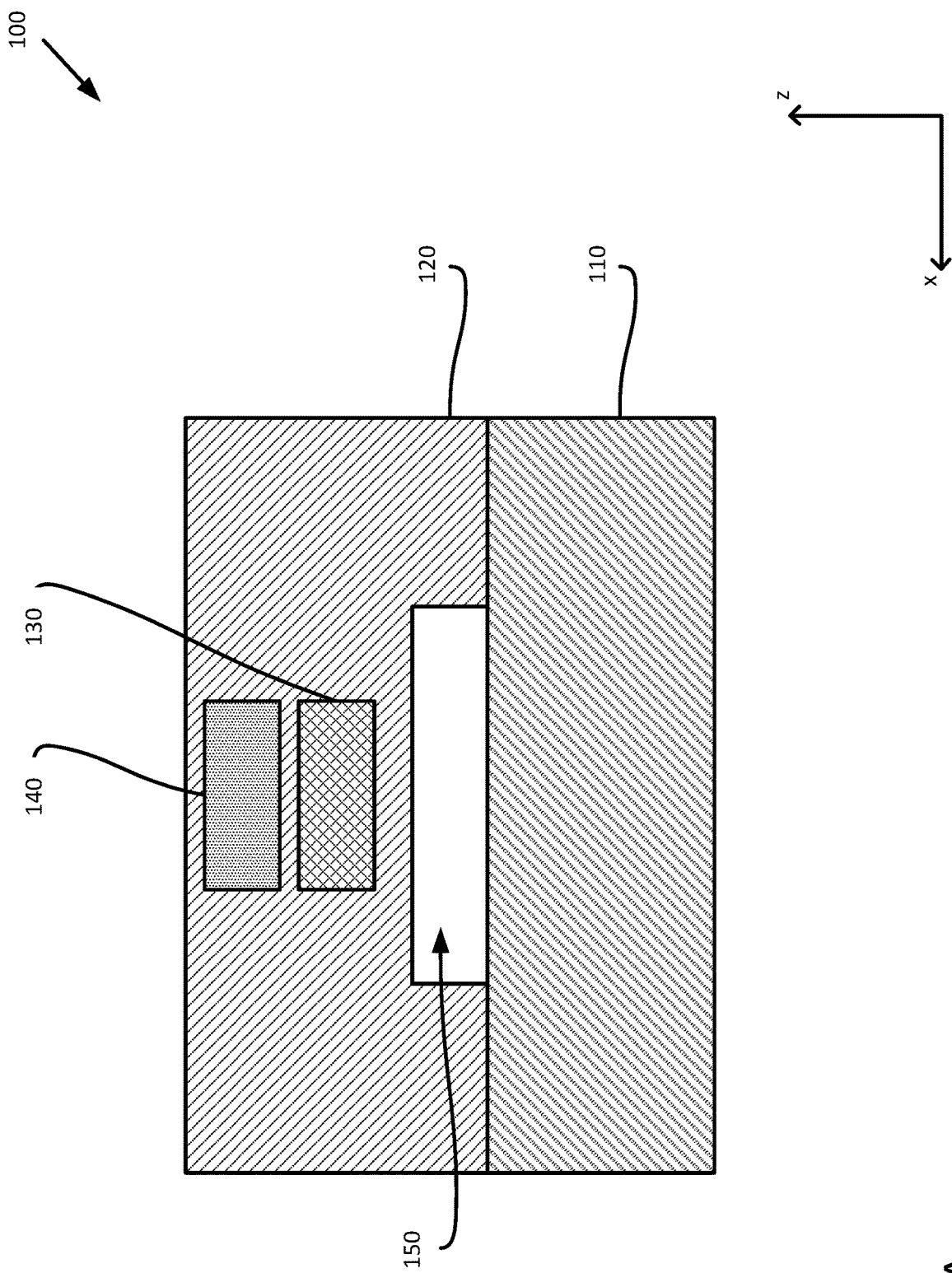
FIGS. 2A-2D illustrate opto-electronic devices in which a trench defining the cavity is formed in the bulk material of a photonic platform, according to embodiments of the present disclosure.
Figure 2B:
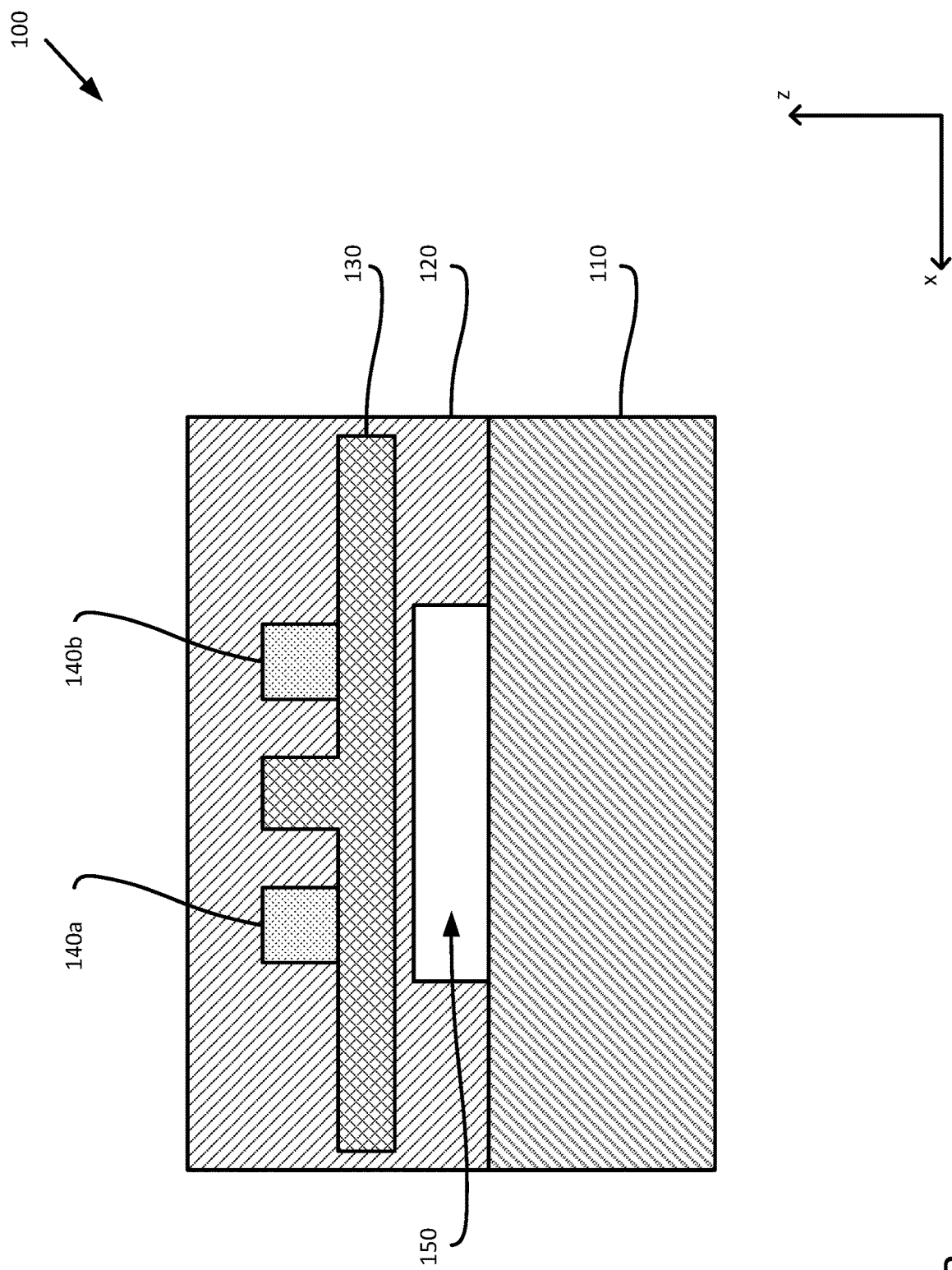
Figure 3A:
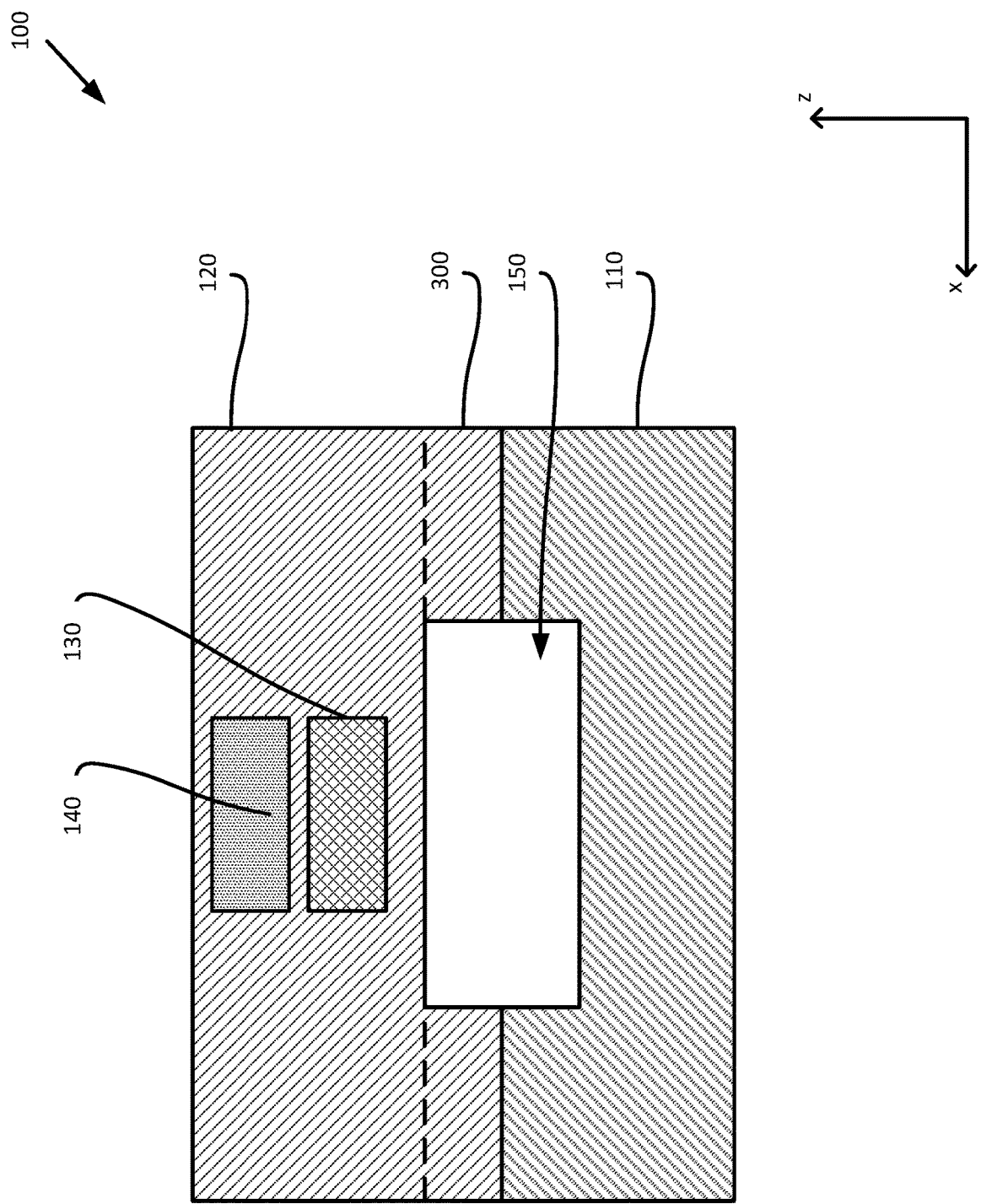
FIGS. 3A-3D illustrate opto-electronic devices in which a trench defining the cavity is formed in the bulk material of a substrate and in the bulk material of a photonic platform, or in the bulk material and a surface layer of a substrate, according to embodiments of the present disclosure.
Figure 3B:
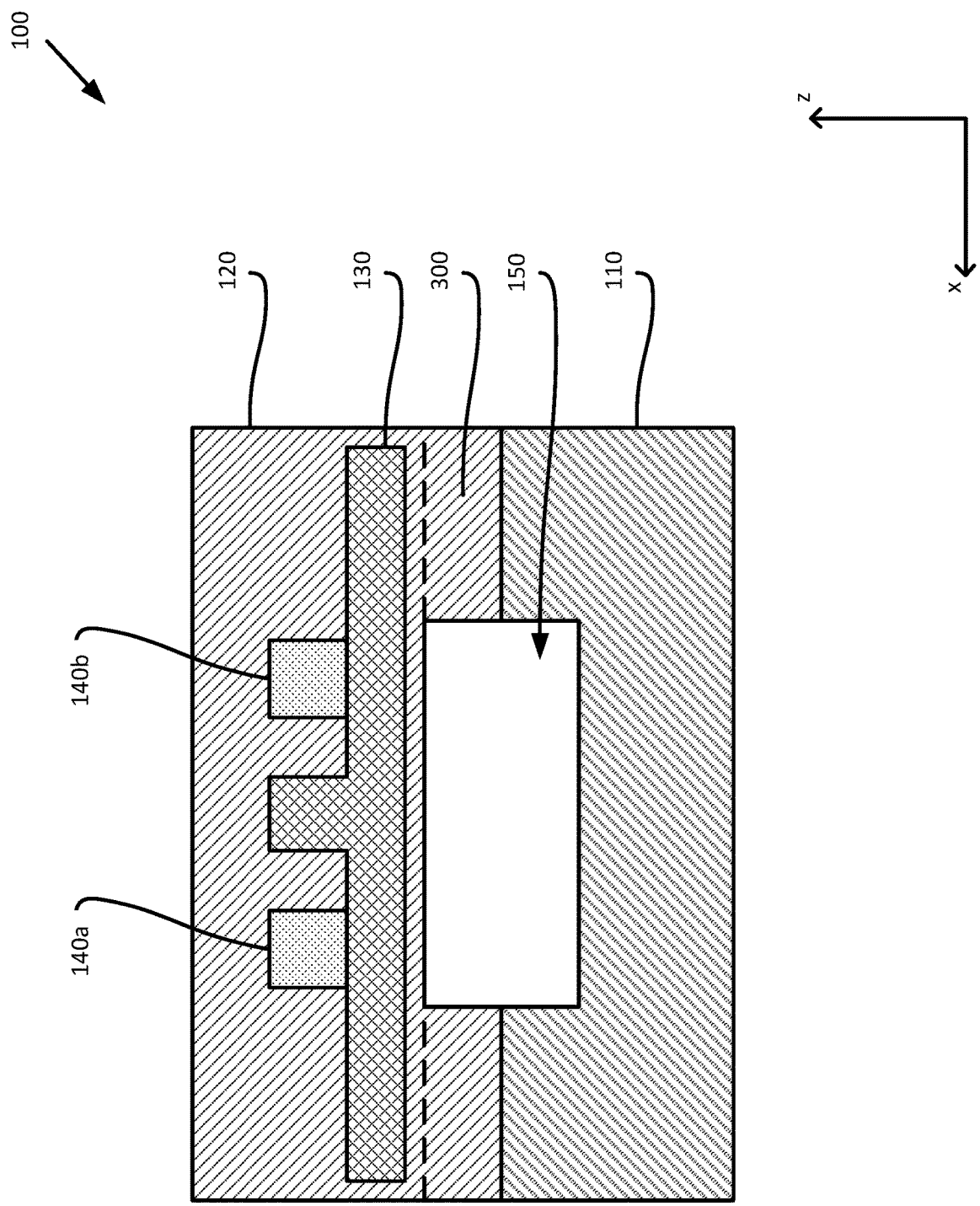

Although various arrangement of waveguides 130, heating elements 140, and cavities 150 are contemplated, a cavity 150 is generally defined relative to the positions and shapes of the waveguides 130 and heating elements 140 (e.g., within X nanometers (nm) of a waveguide 130) to provide thermal isolation from other elements in the opto-electronic device 100. Generally, the cavity 150 can reduce heat transfer from undesired sources and/or the reduce heat transfer away from desired destinations. For example, when a cavity 150 (or other thermal isolation element) is defined between a heating element 140 and a waveguide 130 (e.g., a non-paired heating element 140 on a different waveguide 130), the higher thermal resistance of the media contained in the cavity 150 compared to the media in which heating element 140 and waveguide 130 are defined in impeded transfer of heat from the heating element 140 to the waveguide 130. In another example, when a waveguide 130 is defined between the heating element 140 and the cavity 150, the cavity 150 defines a region with higher resistance to heat transfer than the surrounding dielectric or other medium around the waveguide 130, and thus the cavity 150 reduces or impedes the radiation or transfer of heat away from the waveguide 130 so that more of the heat generated by the heating element 140 is applied to the waveguide 130. In FIGS. 1A, 2A, and 3A, the cavity 150 is defined on an opposite side of the waveguide 130 relative to the heating element 140, and extends (e.g., in the x-direction) past the waveguide 130 and the heating element 140 in a substantially rectangular cross section. FIGS. 1B, 2B, and 3B illustrate a second layout in which a portion of the waveguide 130 is disposed between the cavity 150 and first heating element 140a and a second heating element 140b in the z-direction, and a portion of the waveguide 130 is disposed between the first heating element 140a and a second heating element 140b in the x-direction. In FIGS. 1B, 2B, and 3B, the waveguide 130 extends past cavity 150, and the cavity 150 extends past the heating elements 140a-b in the x-direction, although other arrangements are also possible. In various embodiments, a fabricator may define the cavity 150 fully or partially in one or more of the substrate 110 and the photonic platform 120 throughout the length of the opto-electronic device 100 with varying shapes, sizes, and orientations relative to the waveguide 130 and the heating element 140 to account for different sizes and relative orientations of the waveguides 130 and heating elements 140.

Figure 1C:
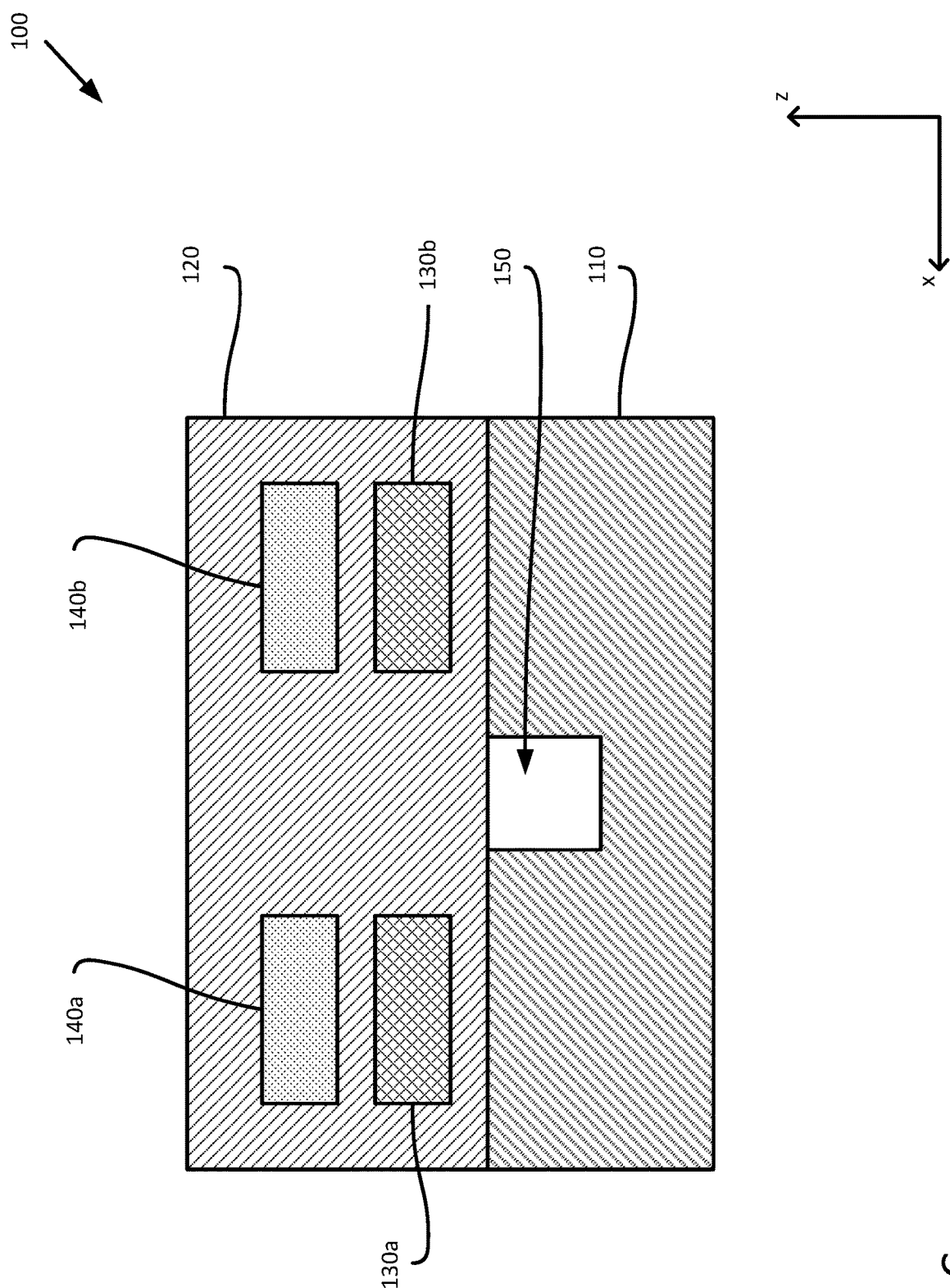
Figure 2C:
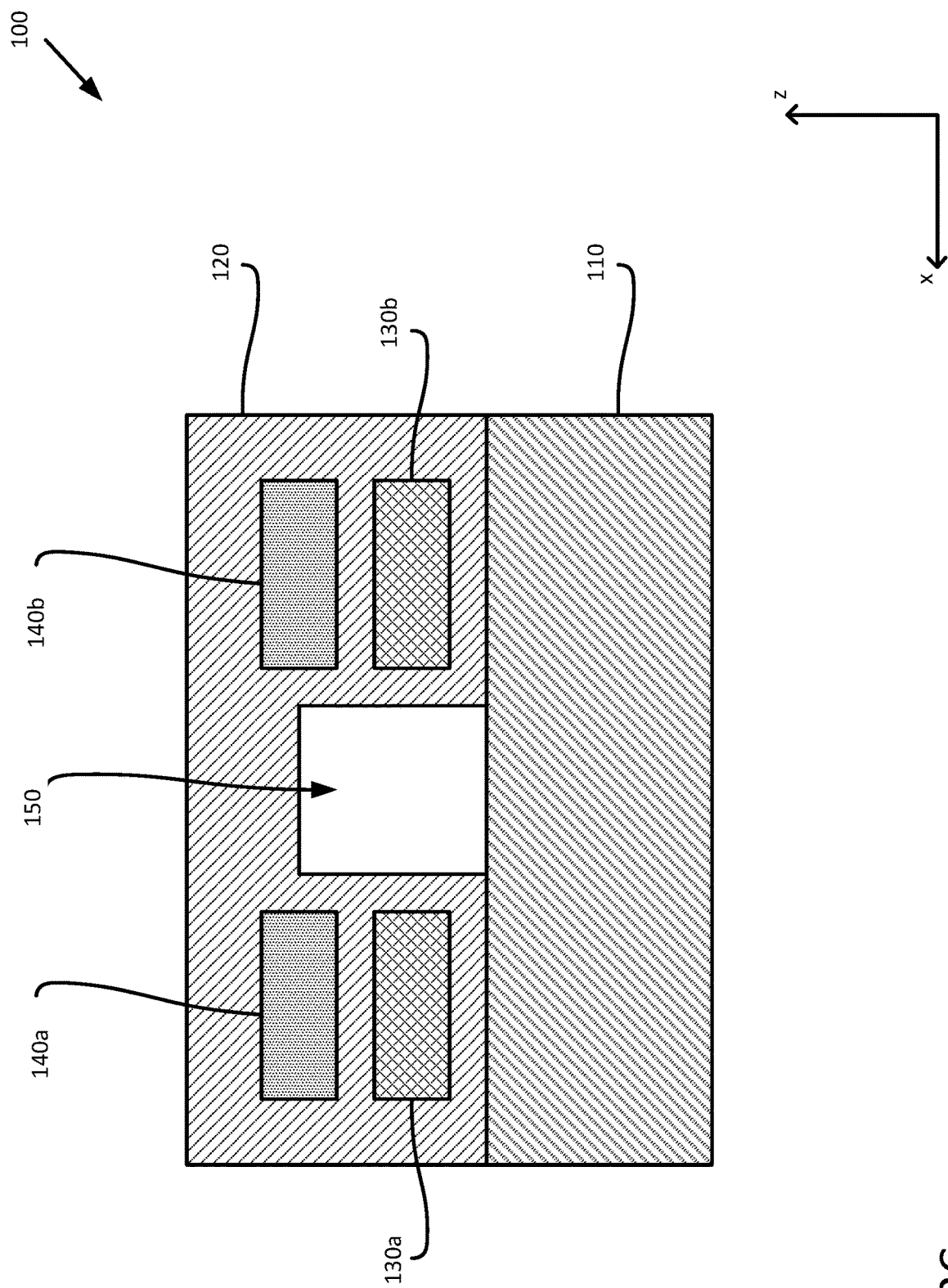
Figure 3C:
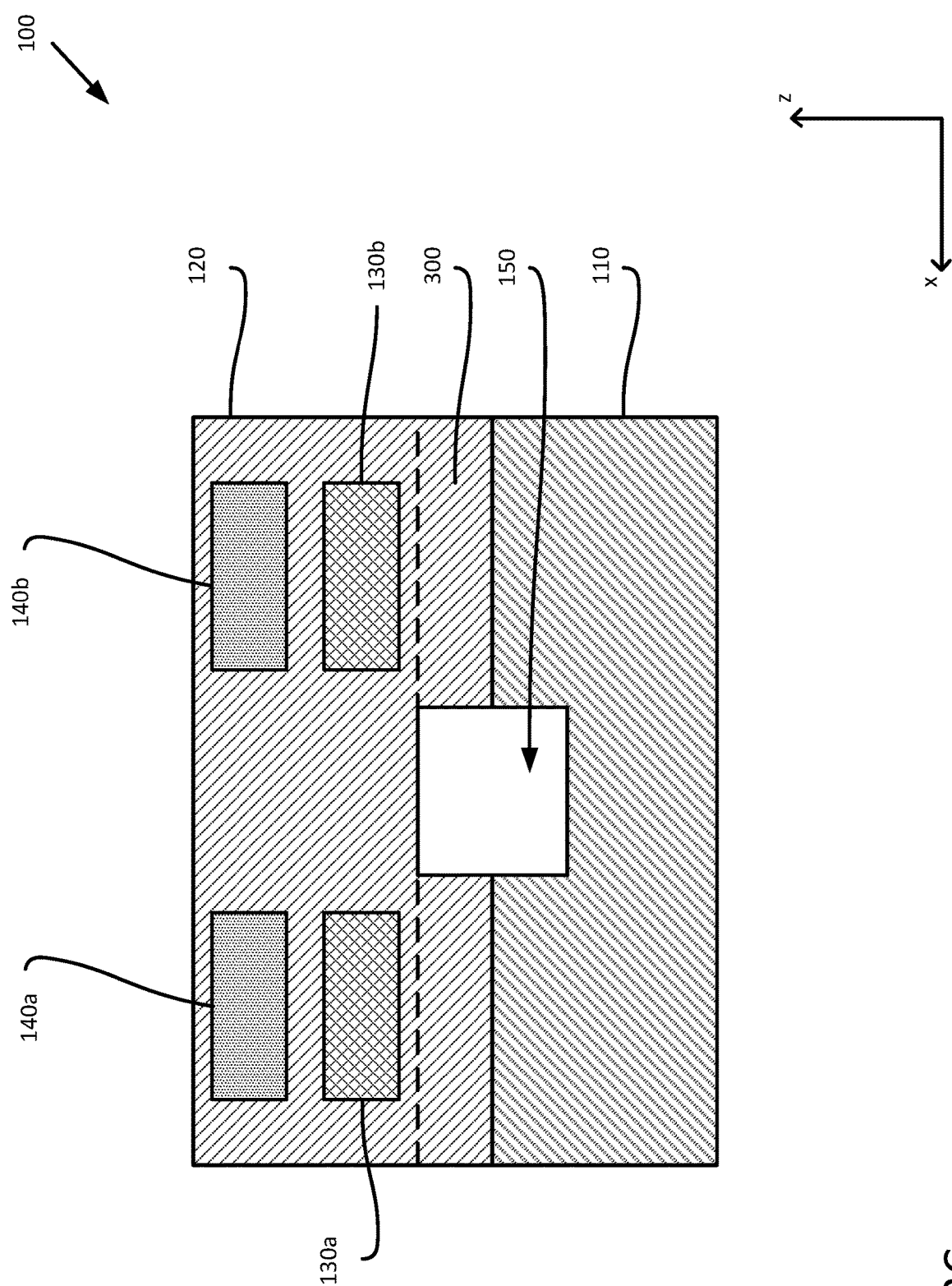

FIGS. 1C, 2C, and 3C illustrate a layout of multiple waveguides 130a-b and associated heating elements 140a-b in one opto-electronic device 100, where one cavity 150 is disposed between the paired waveguides 130a/b and heating elements 140a/b in the x-direction and on an opposite side of the waveguides 130a-b to the heating elements 140a-b in the z-direction. As illustrated, the cavity 150 does not extend to either of the waveguides 130a-b in the x-direction. Because the cavity 150 is located between the waveguides 130a-b, any heat generated by the heating elements 140 or radiated outward by a waveguide 130 may be blocked or delayed from propagating through the substrate 110 to affect the other waveguide 130. Thus the cavity 150 acts to isolate the effects of the first heating element 140a from the second optical waveguide 130b and the effects of the second heating element 140b from the first optical waveguide 130a. Additionally, as is shown in FIG. 2C, the cavity 150 may extend in the z-direction in the photonic platform 120 to (fully or partially) separate the first optical waveguide 130a from the second optical waveguide 130b and the first heating element 140a from the second heating element 140b to further isolate the heating elements 140 from the non-associated waveguides 130 by disrupting heat transmission through the photonic platform 120 between different sets of waveguides 130 and heating elements 140.

Figure 1D:
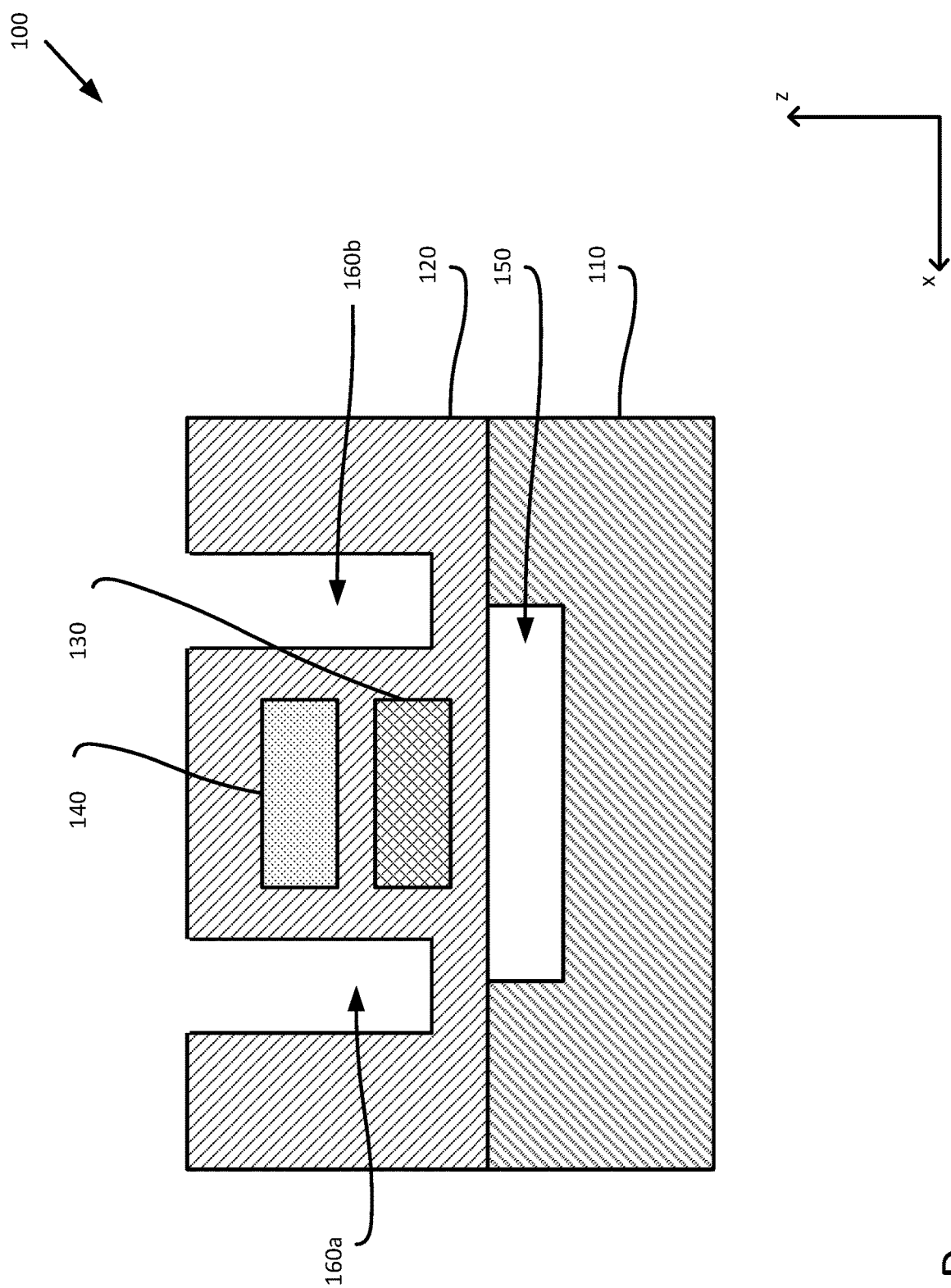
Figure 2D:
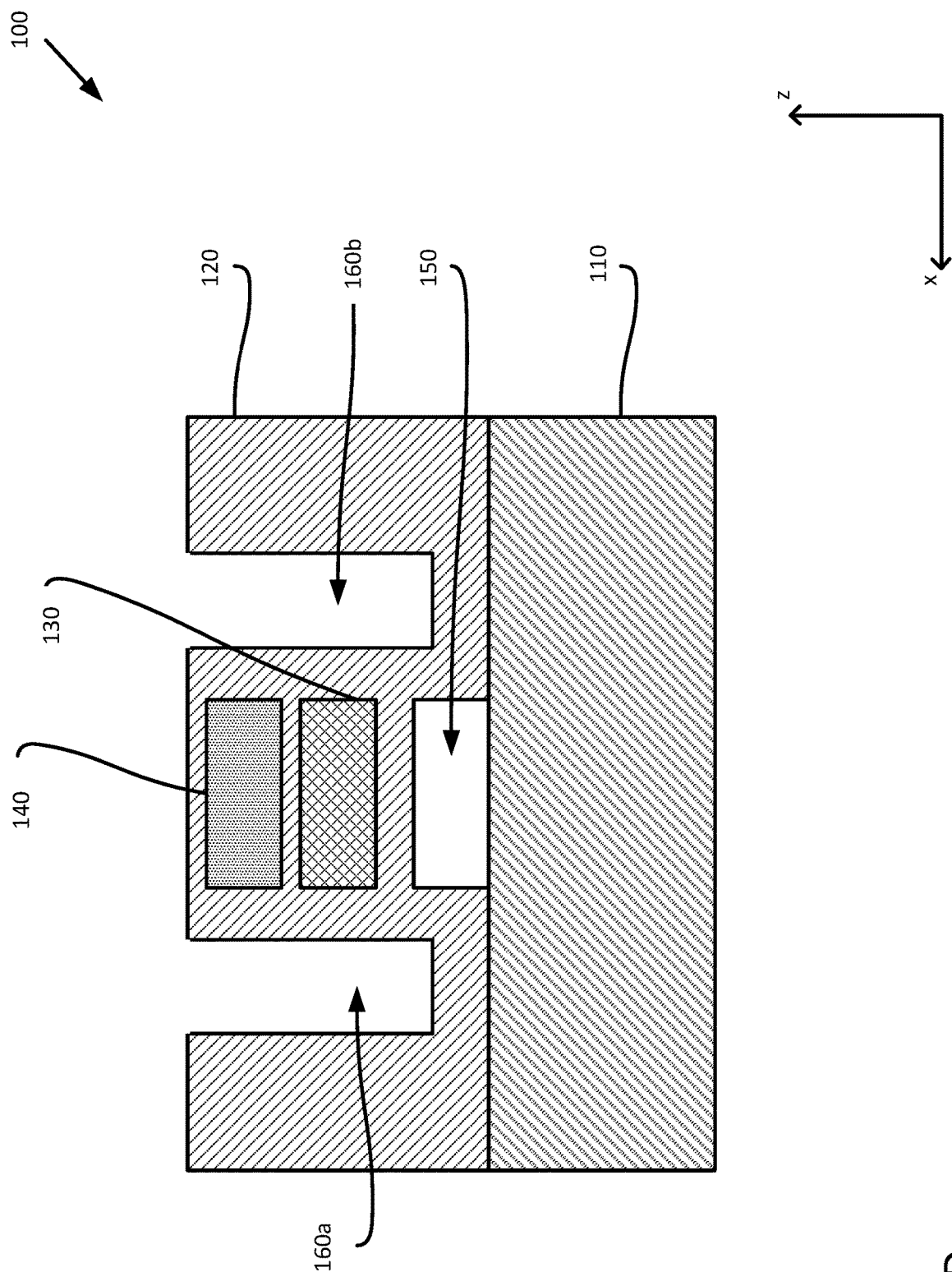
Figure 3D:
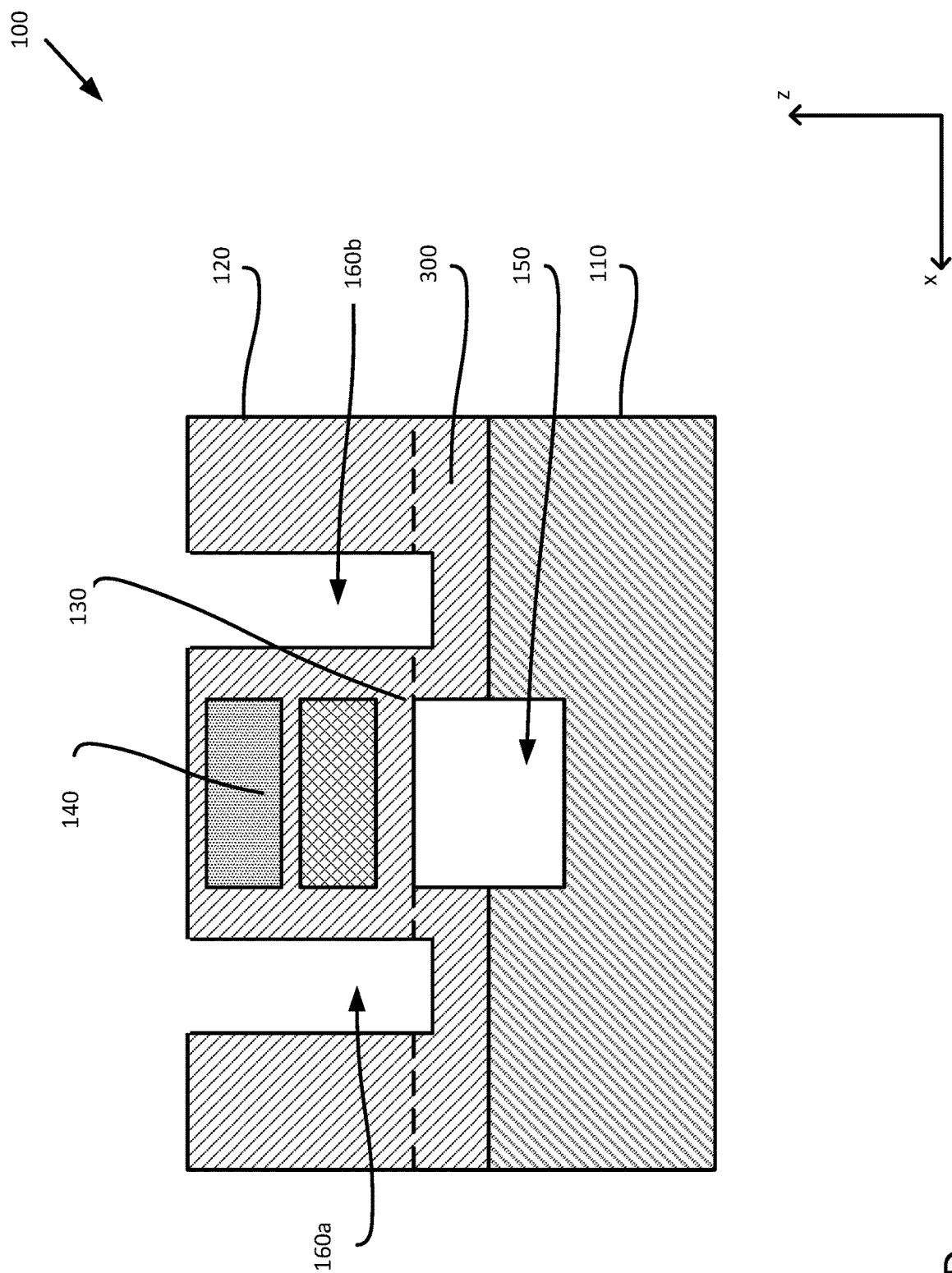

FIGS. 1D, 2D, and 3D illustrate a layout of additional thermal isolators of open channels 160a-b (generally, channel 160 or air channel) defined in the photonic platform 120. In various embodiments, the channels 160 may be capped to form additional cavities 150 (which may be filled with the same or a different gas at the same or different pressure than the cavity 150 defined between the photonic platform 120 and the substrate 110), or may remain open in the final opto-electronic device 100. In various embodiments, the channel 160 are defined between one set of waveguides 130 and heating elements 140 and another set of waveguides 130 and heating elements 140. In other embodiments, the channels 160 are defined around one set of waveguides 130 and heating elements 140 to reduce thermal radiation to other portions of the opto-electronic device 100 or to concentrate the effects of the heating elements 140 on the associated waveguides 130.

Figure 5A:
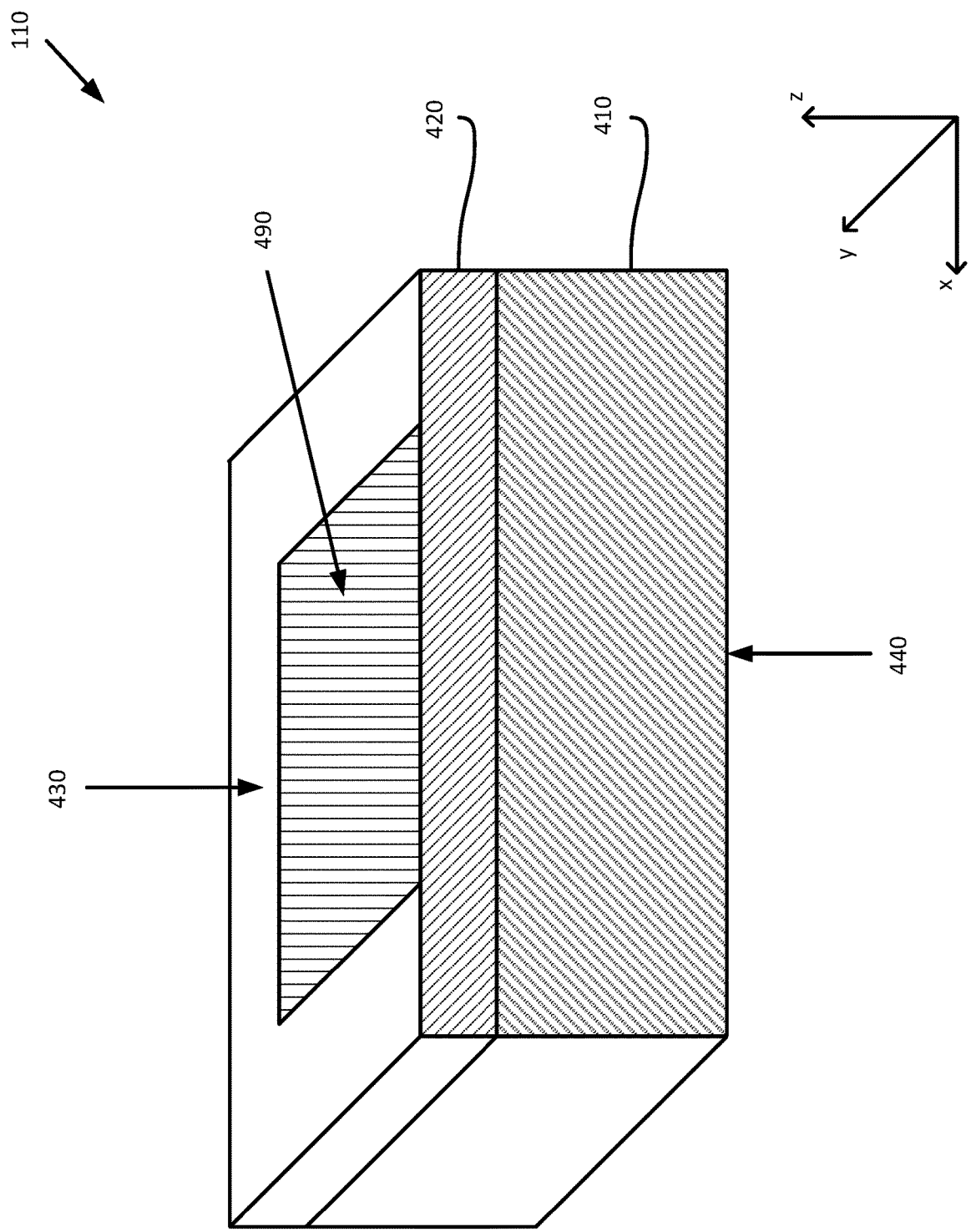
FIGS. 5A-5G illustrate stages of assembly of an opto-electronic device in which a thermal isolation element is formed in the substrate of the opto-electronic device, according to embodiments of the present disclosure.
Figure 5B:
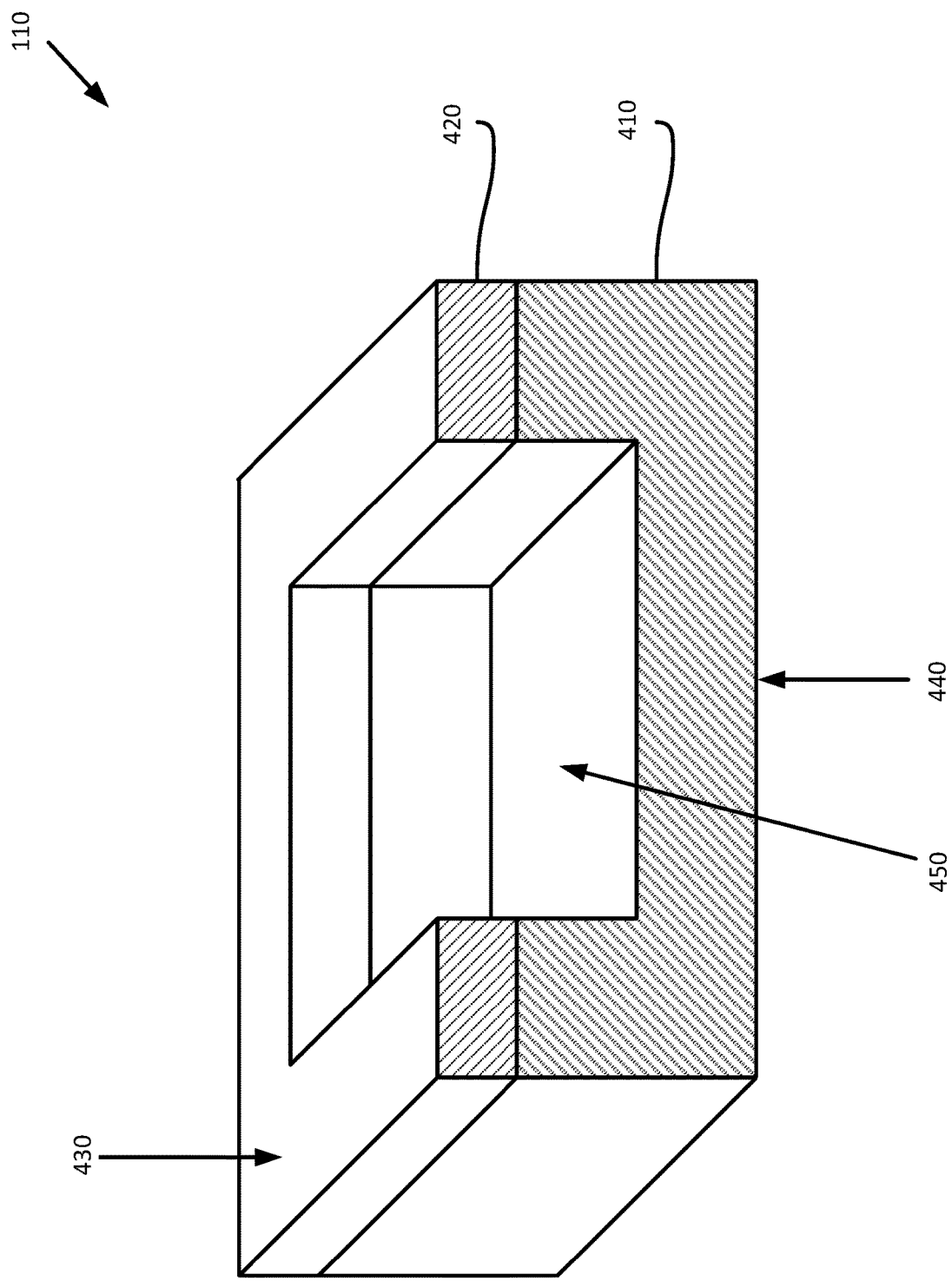
Figure 5C:
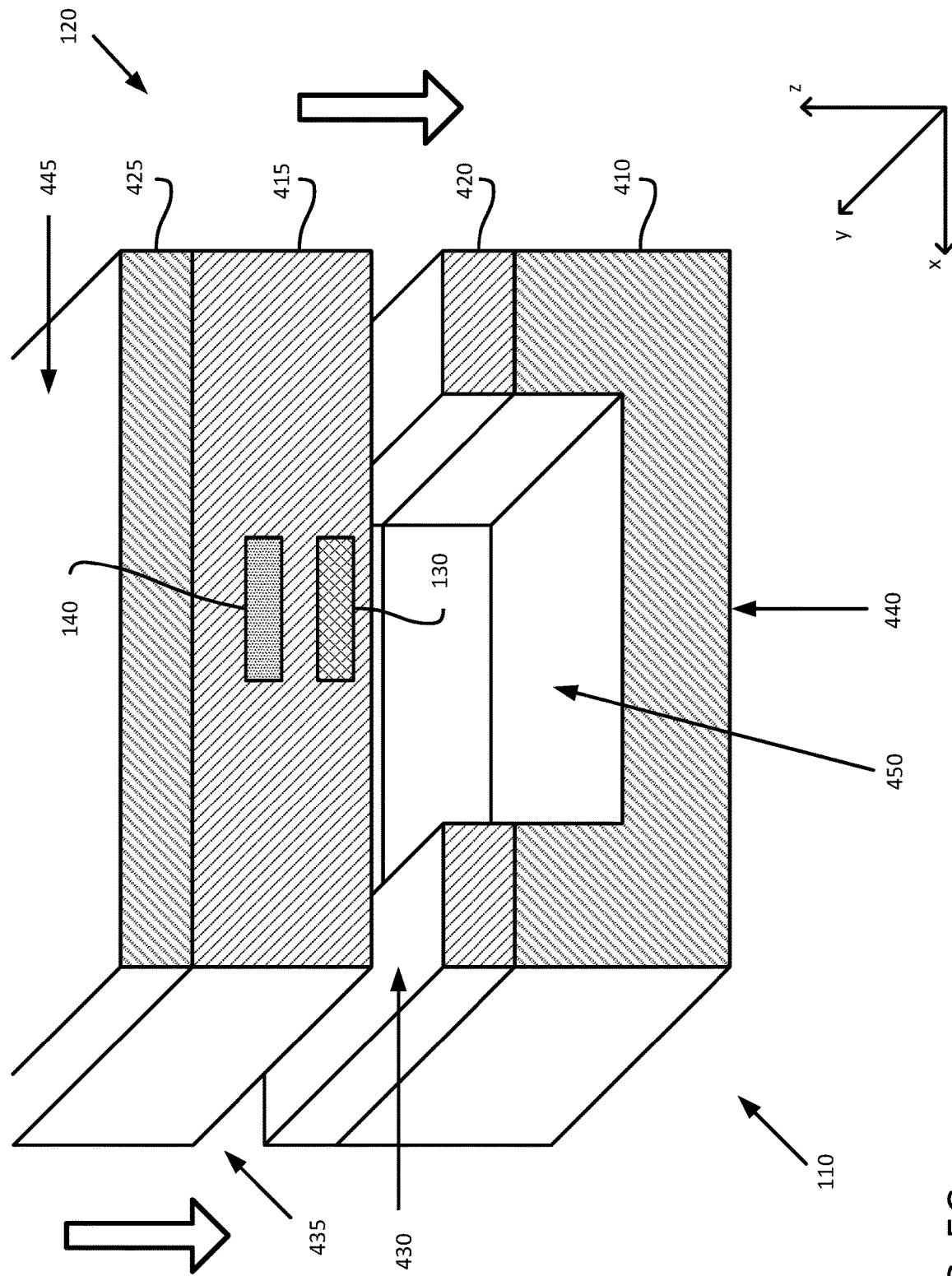
Figure 5D:
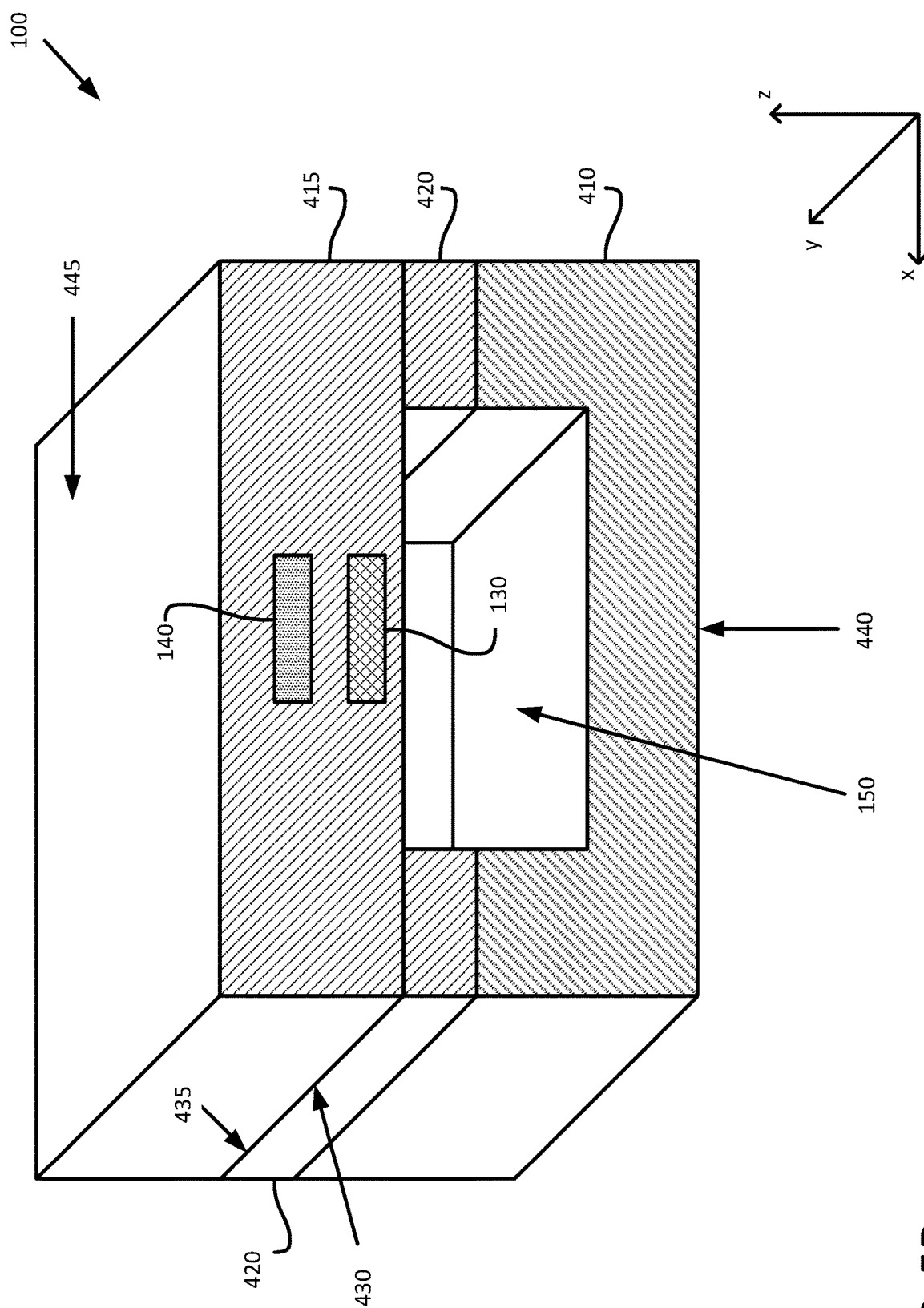
Figure 5E:
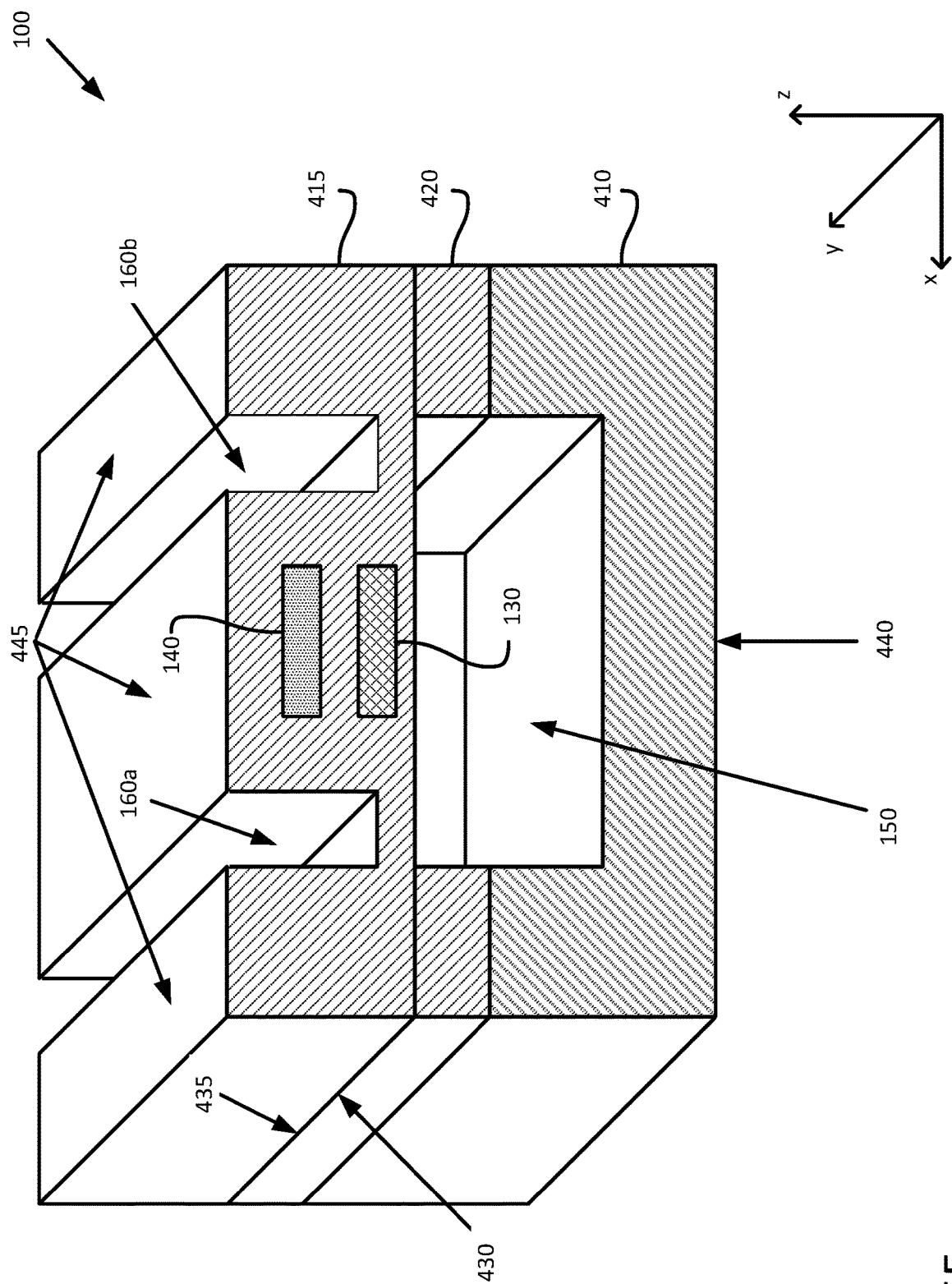
Figure 5F:
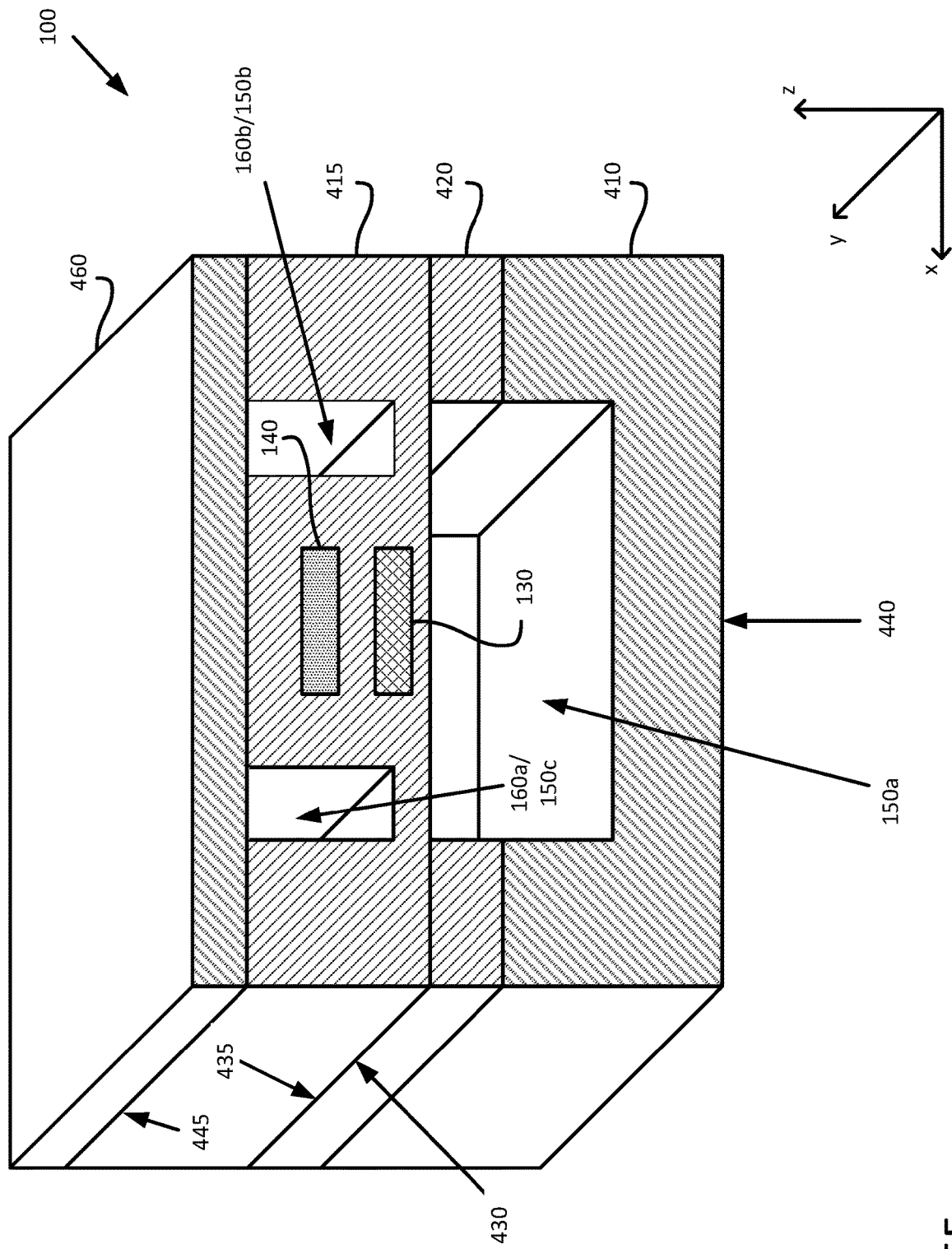
Figure 5G:
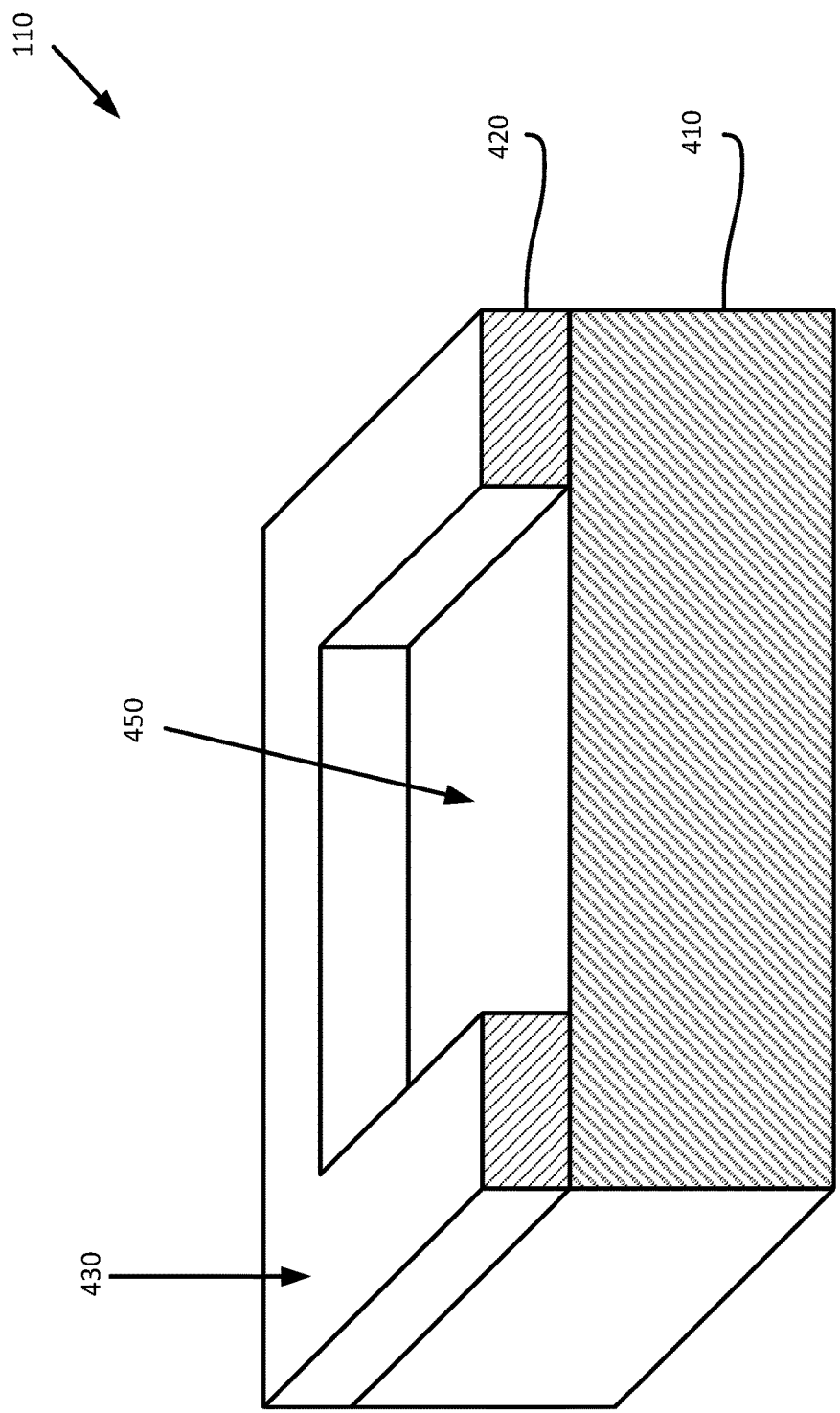
Figure 6:
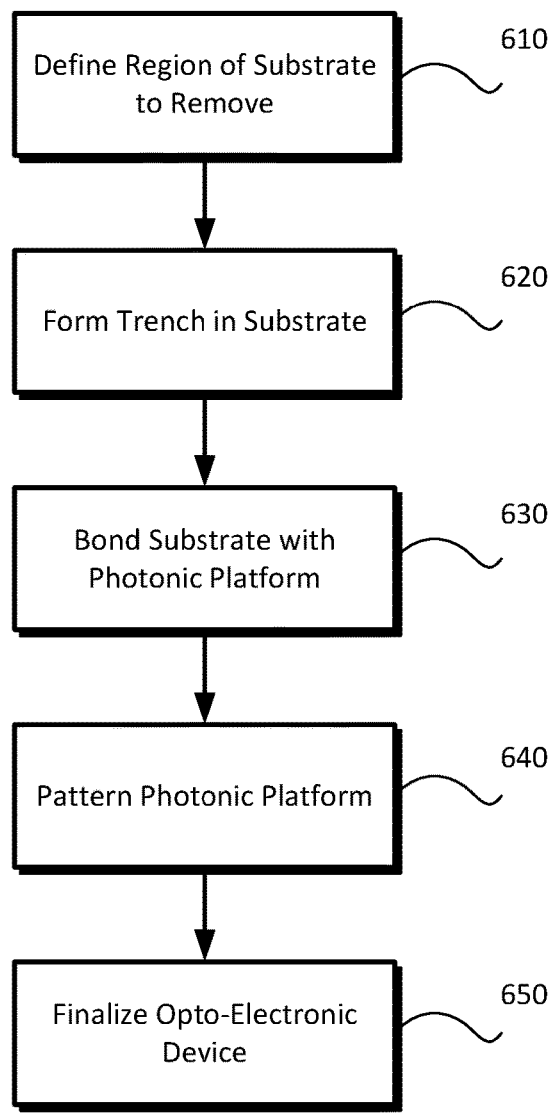
FIG. 6 is a flowchart of a method to form a thermal isolation element in the substrate of an opto-electronic device, according to embodiments of the present disclosure.

FIGS. 4A-4F and FIGS. 5A-5G may be understood in conjunction with a method 600 for fabricating an opto-electronic device 100 by defining a trench in a substrate 110, such as is described in the flowchart of FIG. 6, to form a cavity 150 in an opto-electronic device 100 according to embodiments of the present disclosure.

Figure 4A:
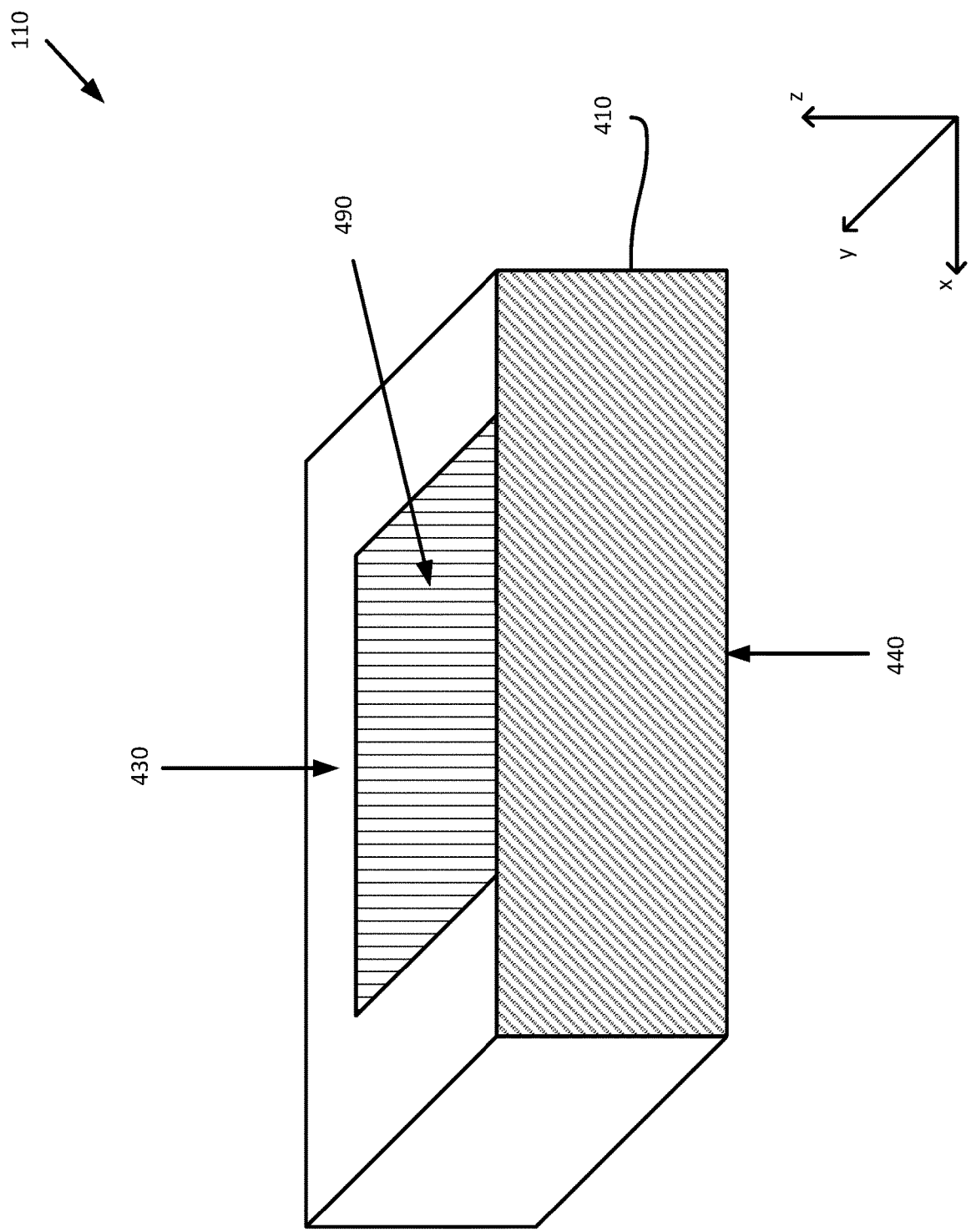
FIGS. 4A-4F illustrate stages of assembly of an opto-electronic device in which a thermal isolation element is formed in the substrate of the opto-electronic device, according to embodiments of the present disclosure.
Figure 4B:
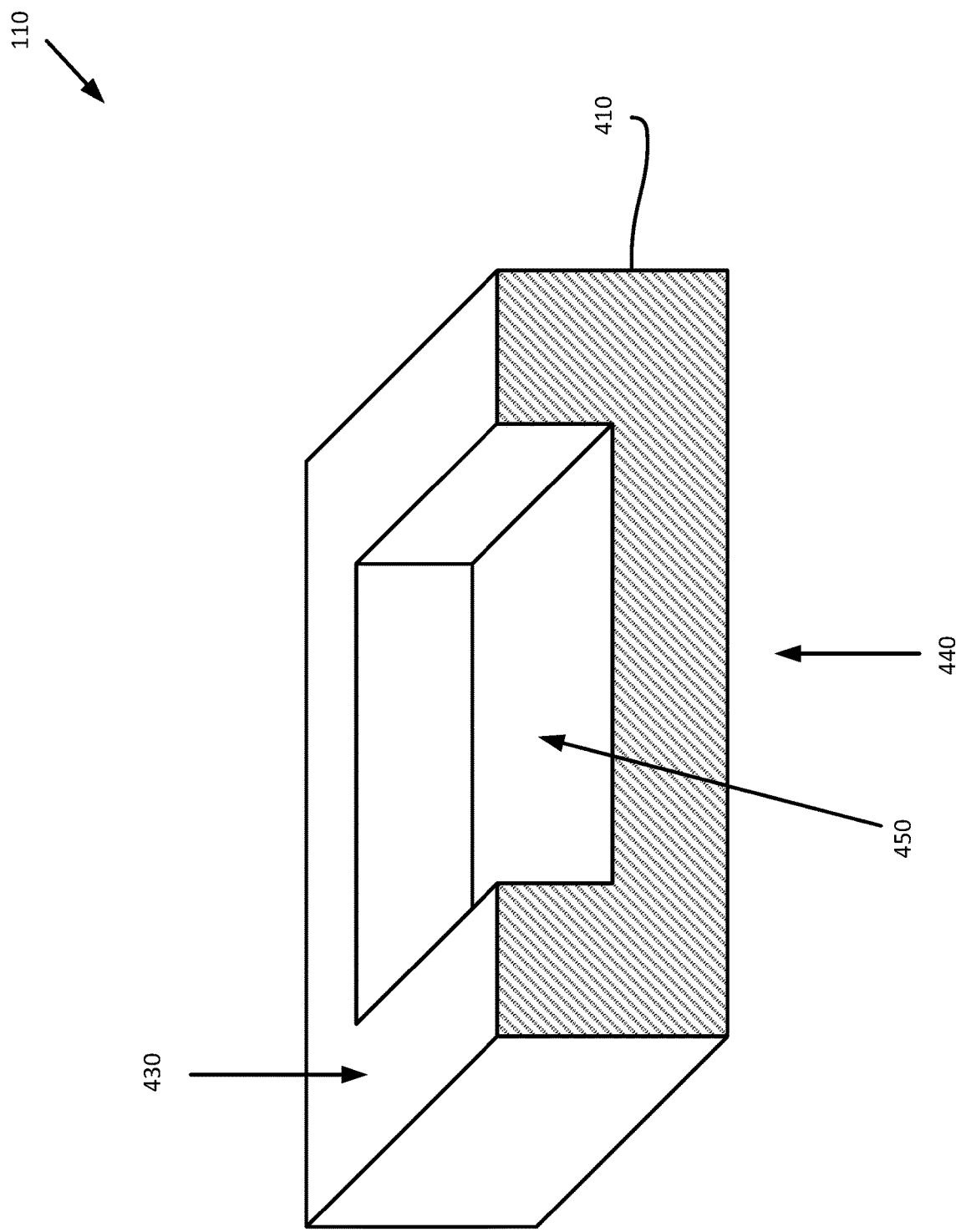

Method 600 begins at block 610, where a fabricator identifies or defines a region 490 of the silicon substrate 110 to remove. The silicon substrate 110 has a first surface 430 and an opposing second surface 440 and includes a Si bulk material 410 (e.g., of a Si Wafer). Optionally, as is illustrated in FIG. 5A, the silicon substrate 110 may include a surface layer 420 of a dielectric (e.g., $SiO_2$) deposited on the first surface 430. As illustrated in FIG. 4A, the region 490 may be defined in the bulk material 410 and/or in the surface layer 420 as is illustrated in FIG. 5A. In various embodiments, the region 490 defines an area to be etched by, for example, a chemical etchant, one or more of laser patterning, or the patterning and application (or lack thereof) of a photoresist mask to portions of the silicon substrate 110.

At block 620, the fabricator forms a trench 450 in the substrate by removing portions of the bulk material 410 and/or material of the surface layer 420 as defined by the region 490. Method 600 may repeat block 610 and block 620 in several rounds of a photolithographic and etching process to define various depths and shapes for the trench 450 before proceeding to block 630. Although shown in the Figures having a generally rectangular cross-sectional shape, the trench 450 may be defined with various cross sectional shapes that vary in size and shape along the length (e.g., in the y-direction) of the substrate 110. The trench 450 may be defined in the bulk material 410 (as per FIG. 4B), in the bulk material 410 and the surface layer 420 (as per FIG. 5B), or only in the surface layer 420 (as per FIG. 5G).

Figure 4C:
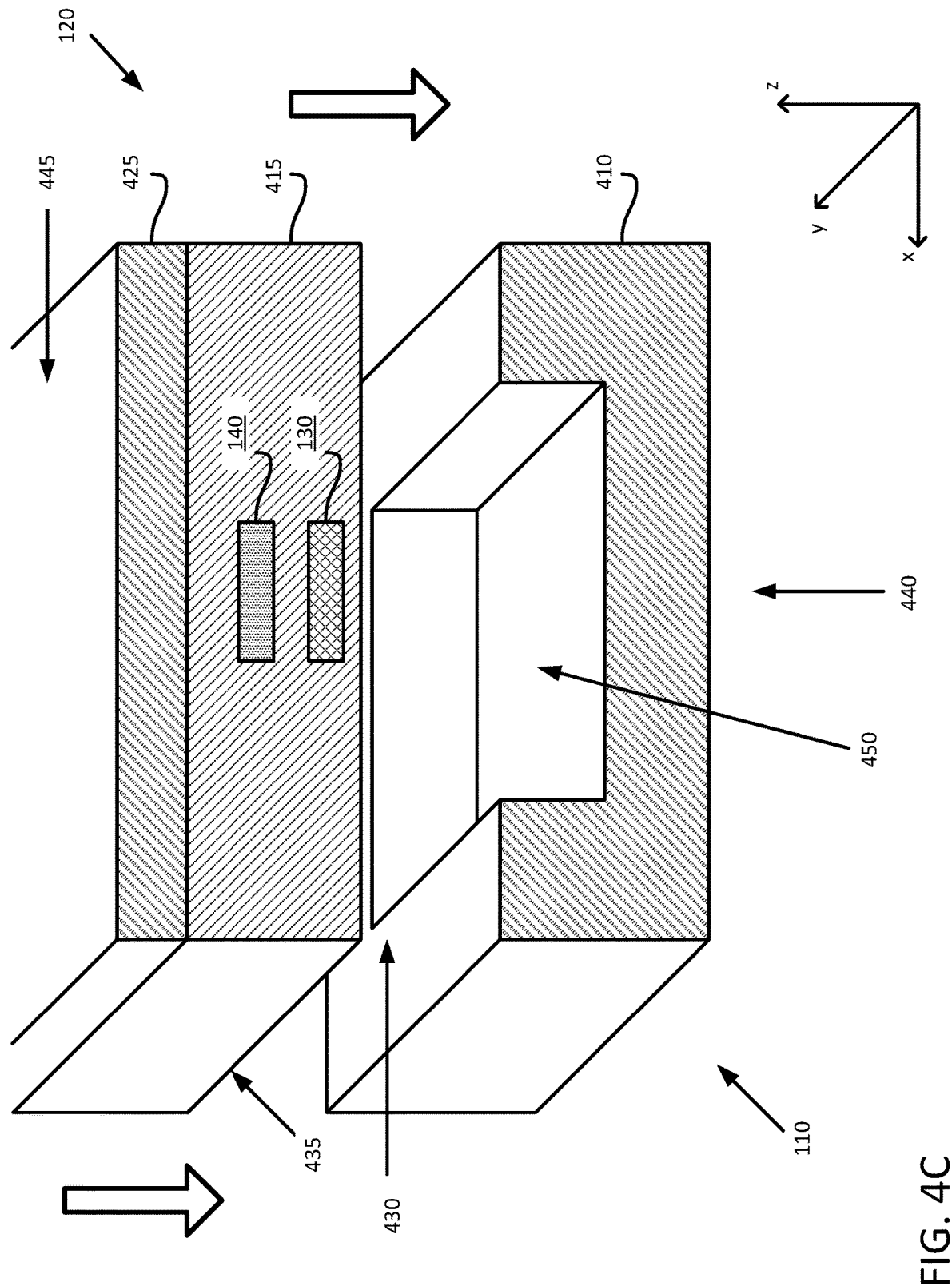
Figure 4D:
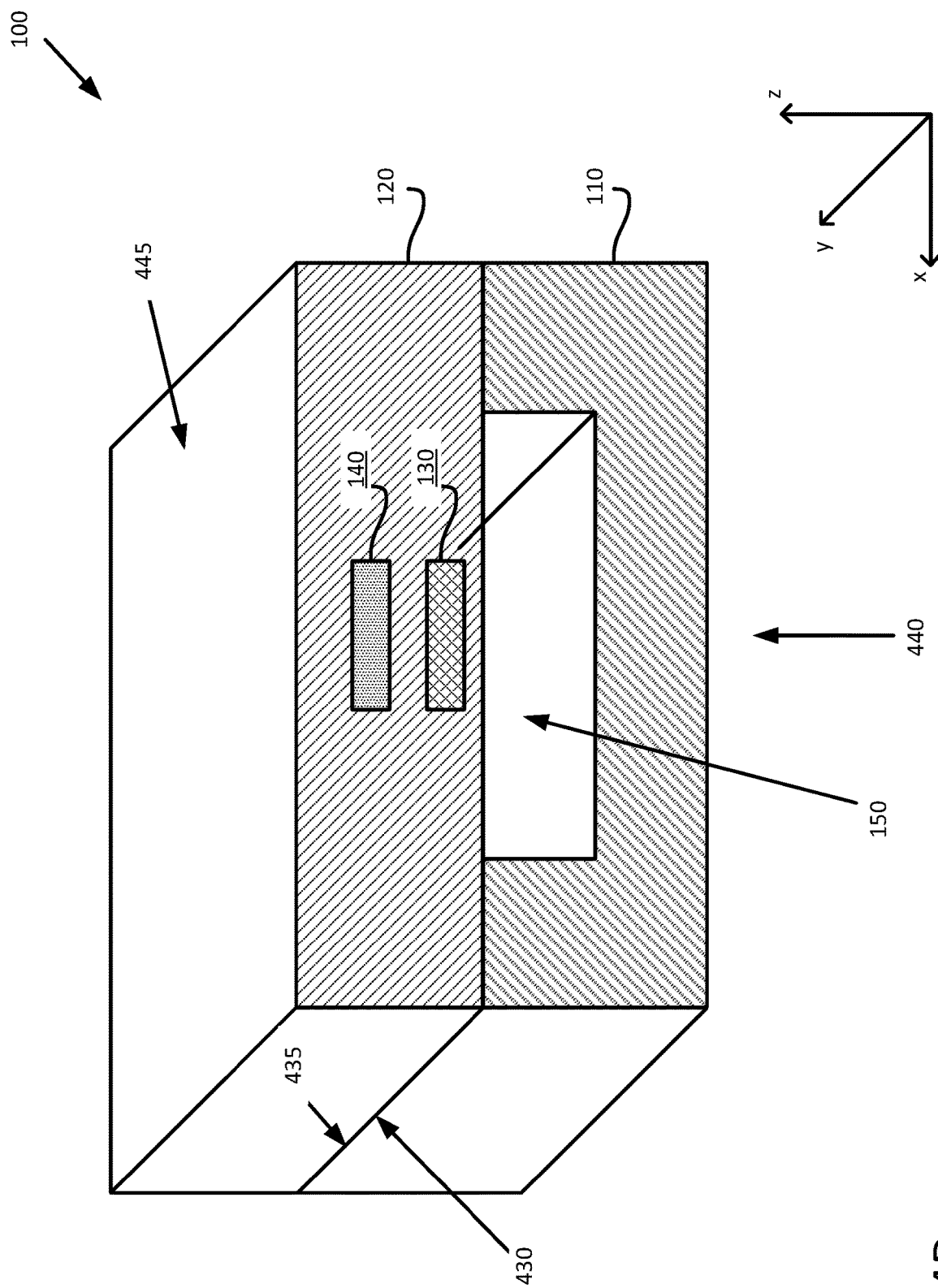
Figure 4E:
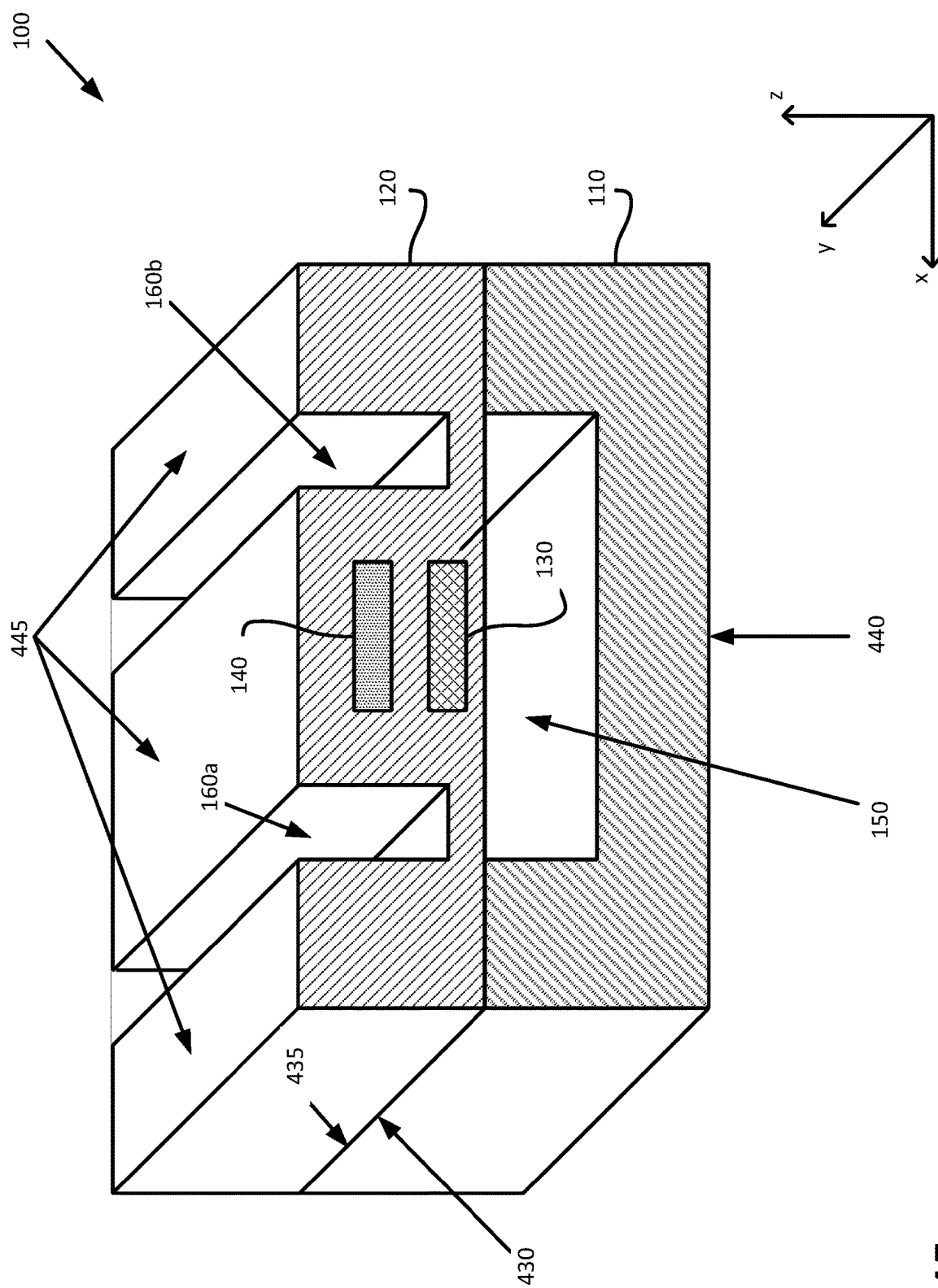
Figure 4F:
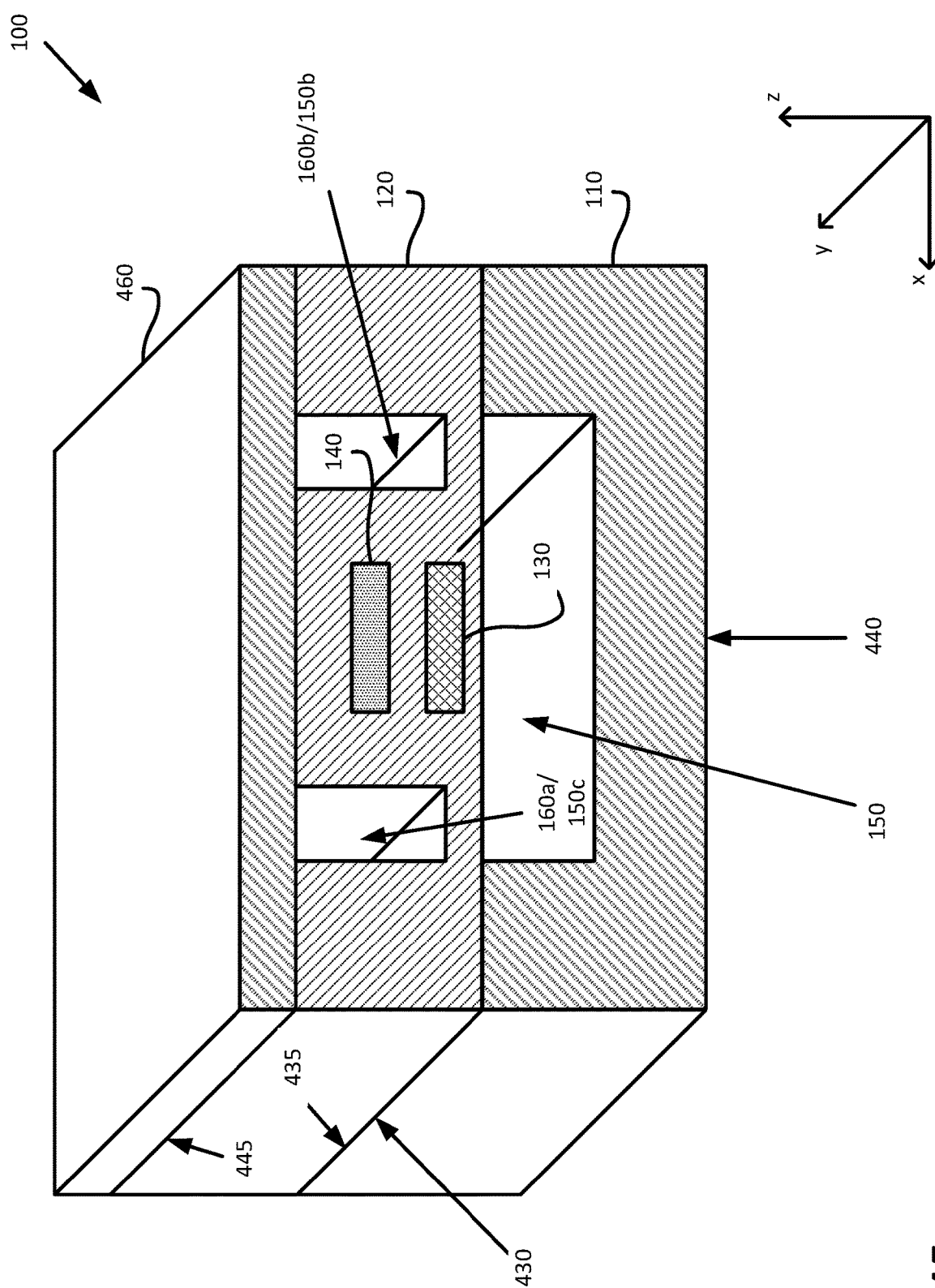

At block 630, the fabricator bonds the substrate 110 with a silicon photonic platform 120 (e.g., per FIG. 4C and FIG. 5C). The photonic platform 120 includes a first surface 435 that the fabricator bonds to the first surface 430 of the substrate 110 and a second surface 445 opposite to the first surface 435. A fabricator forms or deposits a dielectric 415 on a base 425 such as a second silicon wafer on which a dielectric 415 (e.g., $SiO_2$), the waveguide 130, and heating element 140 are formed. In various embodiments, the base 425 is removed from the photonic platform 120 before bonding the photonic platform 120 to the substrate 110. The fabricator aligns the substrate 110 with the photonic platform 120 to position the waveguide 130 and the heating element 140 relative to the trench 450 so that the first surface 435 of the photonic platform 120 seals the opening of the trench 450 in the first surface 430 of the substrate 110 thereby forming the cavity 150.

In some embodiments, the fabricator uses an oxide-to-oxide bonding technique, such as plasma assisted bonding, to form a bond between the respective surfaces of the substrate 110 and the photonic platform 120. Additionally or alternatively, a fabricator may use various epoxies, thermocompression, and other bonding techniques to bond the substrate 110 and the photonic platform 120 together. The bonded first surfaces 430/435 assure an airtight seal to maintain the pressure and atmosphere (e.g., gas composition or vacuum) in the cavity 150 at the time of bonding the substrate 110 and photonic platform 120 with one another.

In various embodiments, the fabricator bonds a plurality of photonic platforms 120 with a plurality of substrates 110 in a wafer-to-wafer bonding process where the photonic platforms 120 are defined in dies on a first wafer and the substrates 110 are defined in a corresponding number of dies on a second wafer. When bonding multiple wafers together, the faces of the wafers are aligned with one another so that the respective plurality of dies defined in each wafer mate with one another. By mating a first and a second plurality of dies together that are formed from separate wafers, a fabricator may use different processes and materials (which may be otherwise incompatible with one another for vapor deposition or other additive fabrication techniques) to form the different components and features (e.g., the trench 450) on the substrate 110 and the photonic platform 120. In various embodiments, the faces of the wafers that are to be bonded together include various alignment features (e.g., wafer level alignment features) that are matched with alignment features present on the other wafer. In some embodiments, the alignment features are defined on a face of the wafer in an area not occupied by the dies, but in other embodiments, the dies may include alignment features.

At block 640, a fabricator patterns the photonic platform 120. In some embodiments, the fabricator removes the base 425 to reveal the dielectric 415 as the second surface 445 of the opto-electronic device 100 (e.g., as per FIG. 4D and FIG. 5D). In some embodiments, the fabricator defines one or more channels 160 (e.g., as per FIG. 4E and FIG. 5E) from the second surface 445 into the dielectric 415 (e.g., by physical and/or chemical etching) to provide additional thermal isolation elements in the opto-electronic device 100. In yet further embodiments, the fabricator bonds a cap 460 to the second surface 445 of the photonic platform 120 to seal the channels 160 to form additional cavities 150 (e.g., cavities 150b-c in addition to cavity 150a in FIG. 4F and FIG. 5F).

At block 650, a fabricator finalizes the opto-electronic device 100. In various embodiments, finalizing the opto-electronic device 100 includes dicing individual opto-electronic devices 100 from dies defined on a wafer, polishing and/or applying optical interface coatings to ends of the waveguides 130, forming electrical traces to the heating elements 140, mounting electrical components to the opto-electronic device 100, bonding the opto-electronic device 100 to a sub-mount for inclusion in another assembly, etc. Method 600 may then conclude.

Figure 7A:
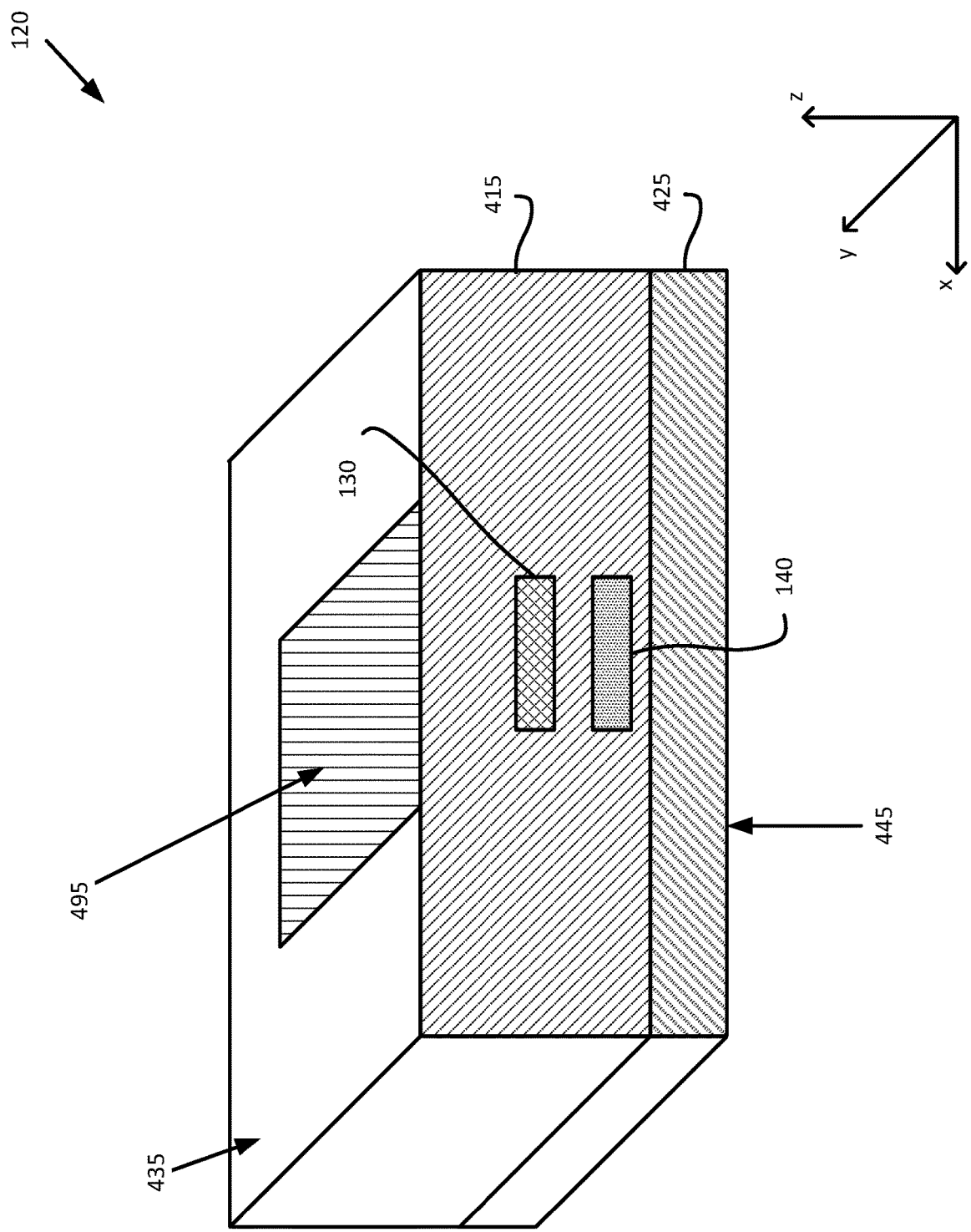
FIGS. 7A-7F illustrate stages of assembly of an opto-electronic device in which a thermal isolation element is formed in the photonic platform of the opto-electronic device, according to embodiments of the present disclosure.
Figure 7B:
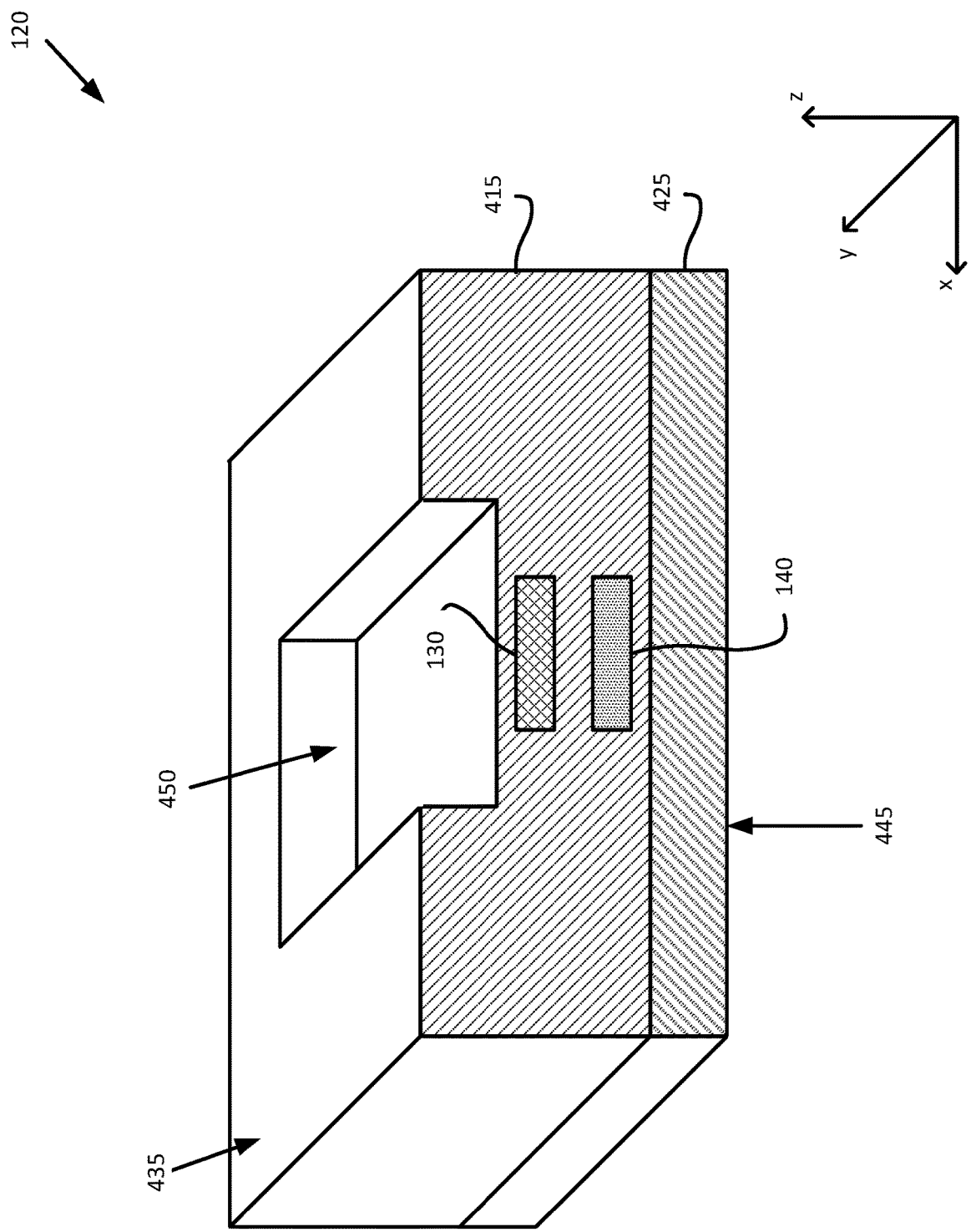
Figure 7C:
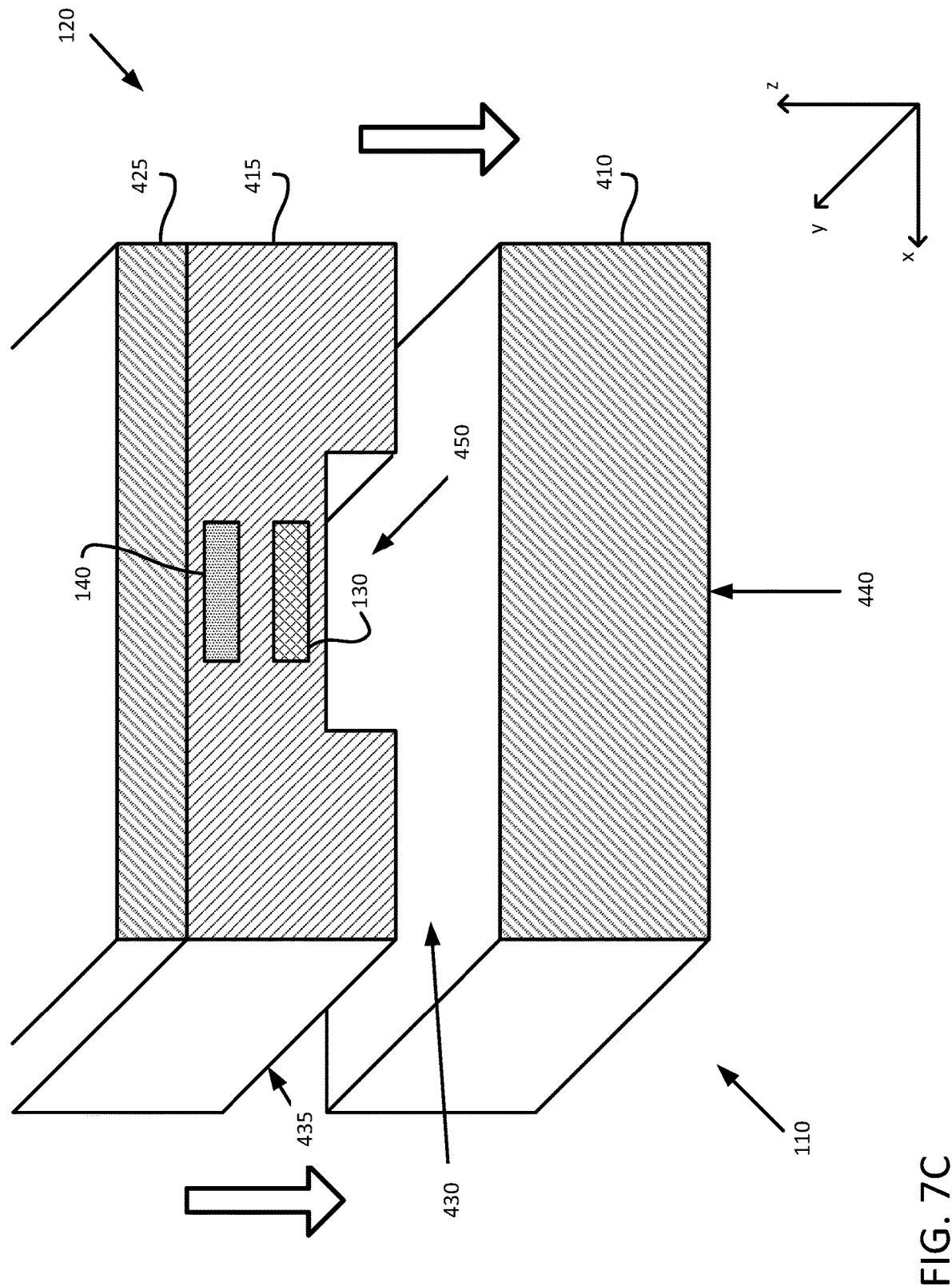
Figure 7D:
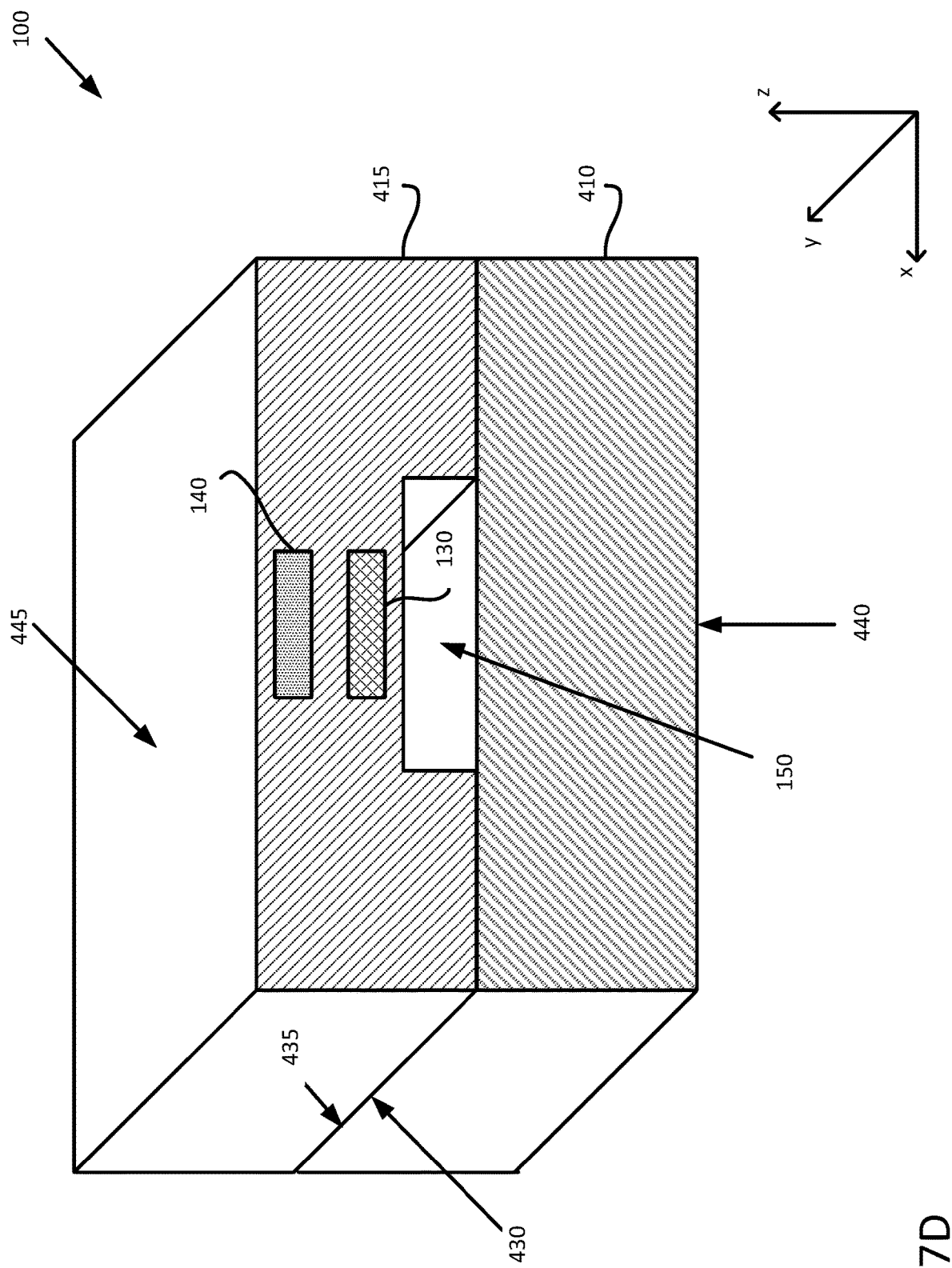
Figure 7E:
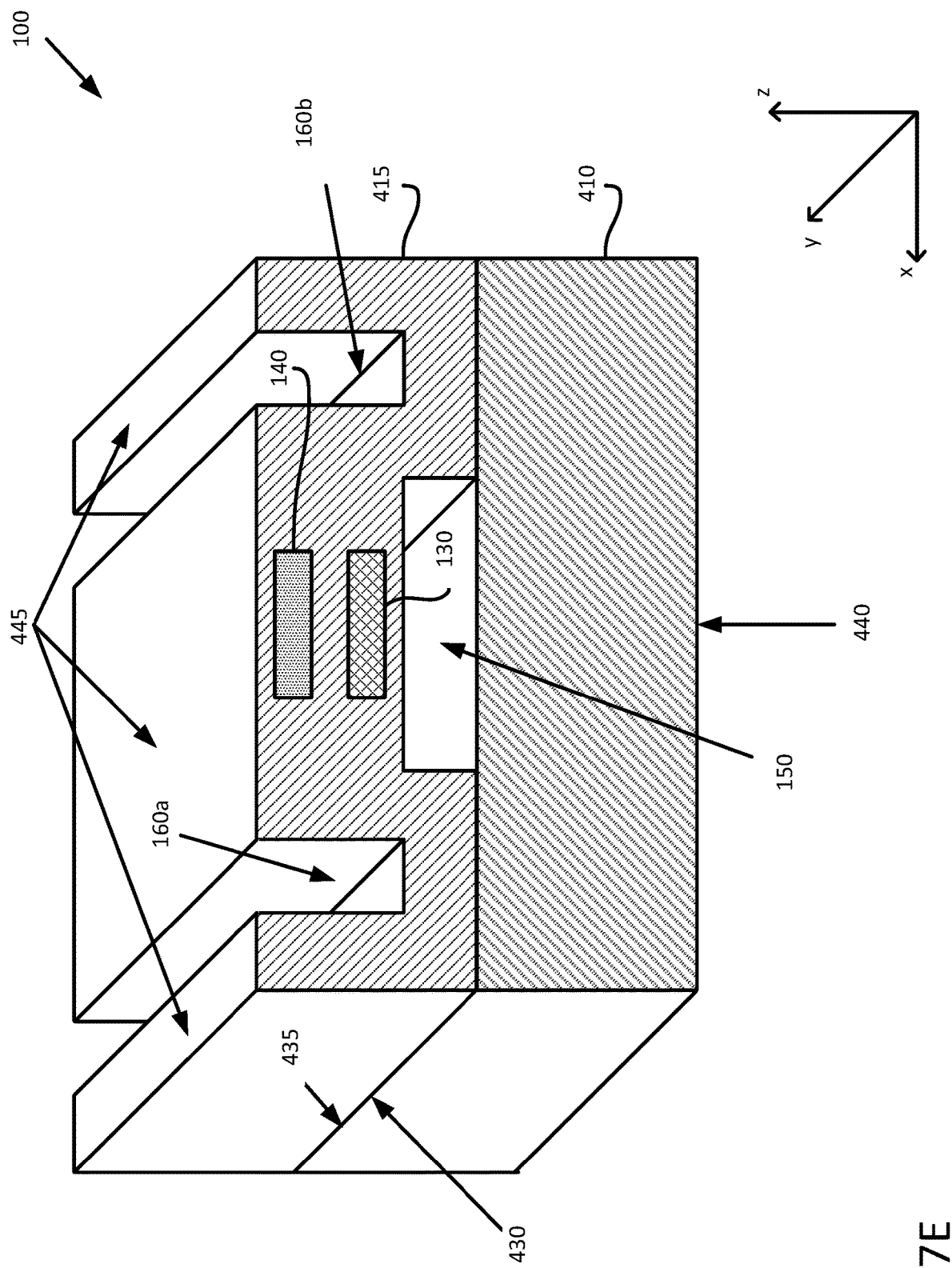
Figure 7F:
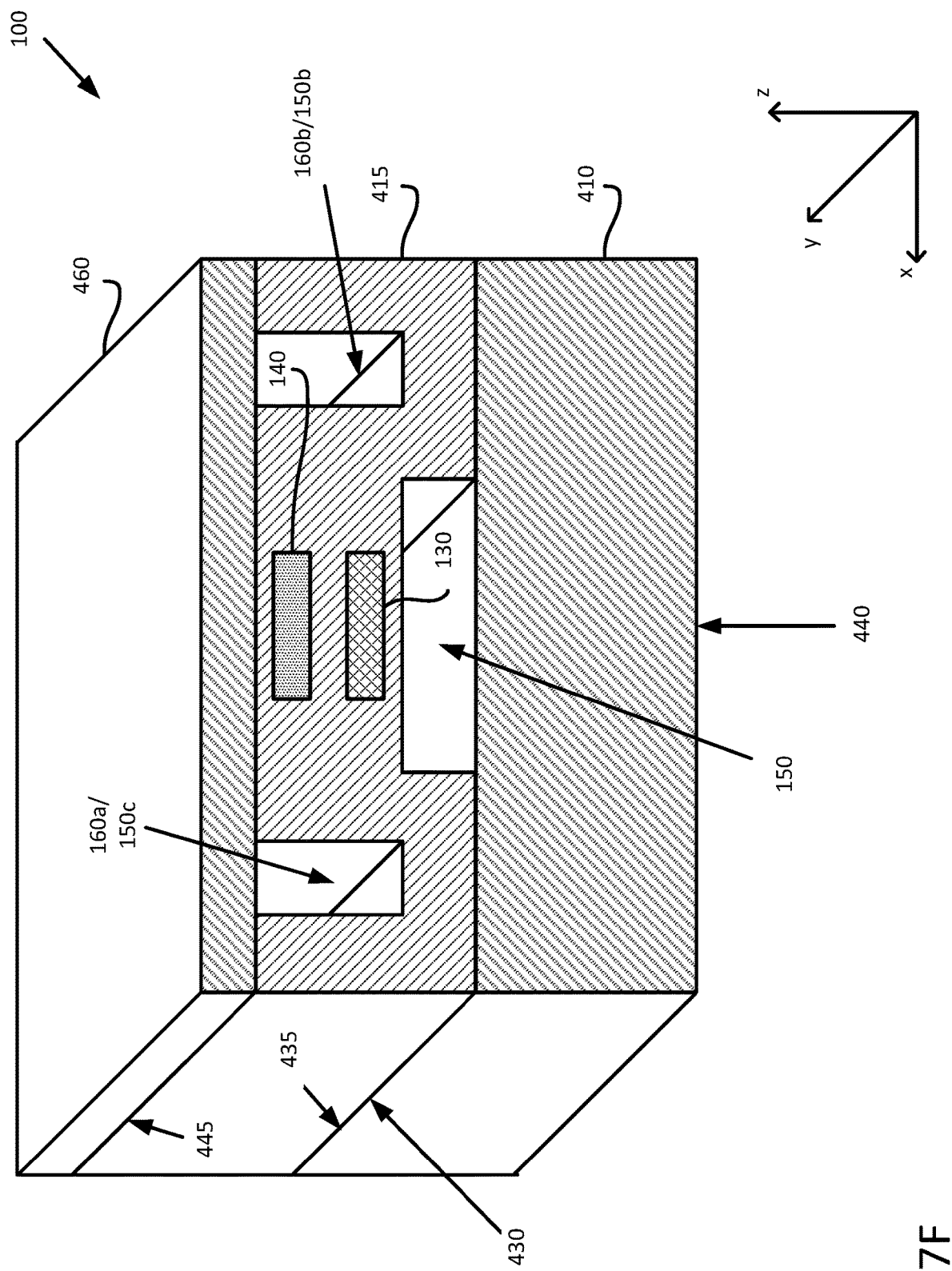
Figure 8:
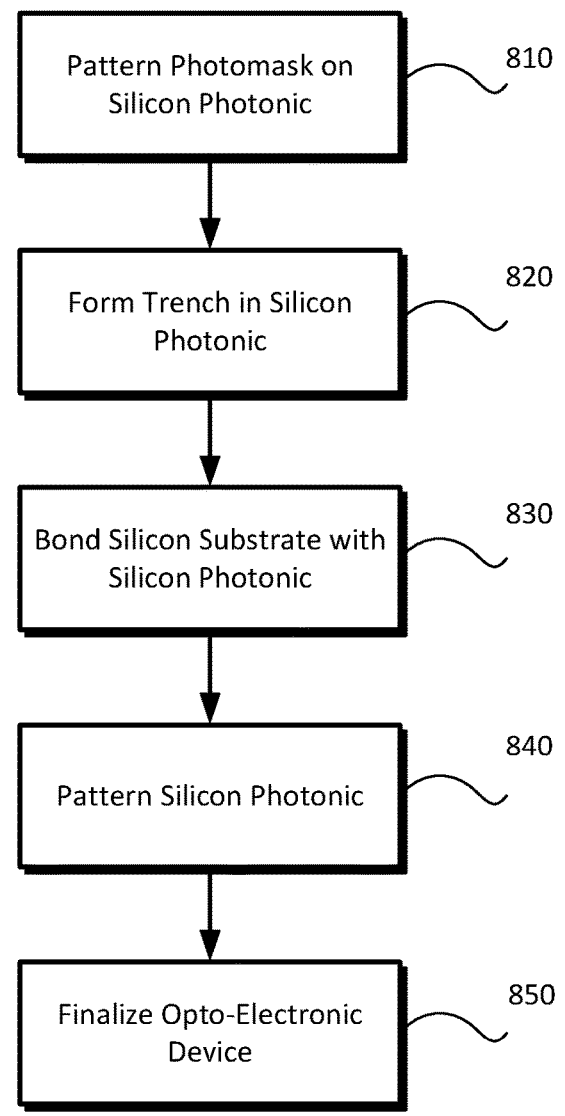
FIG. 8 is a flowchart of a method to form a thermal isolation element in the photonic platform of an opto-electronic device, according to embodiments of the present disclosure.

FIGS. 7A-7F may be understood in conjunction with a method 800 for fabricating an opto-electronic device by defining a trench in a photonic platform 120, such as is described in the flowchart of FIG. 8, to form a cavity 150 in an opto-electronic device 100 according to embodiments of the present disclosure. As will be appreciated, method 800 may be performed in conjunction with method 600, as described in relation to FIG. 6, to define trenches in both the substrate 110 and the photonic platform 120 that co-define the cavity 150. When method 600 and method 800 are performed in conjunction with one another, block 630 and block 830 may be performed as one operation, block 640 and block 840 may be performed as one operation, and block 650 and block 850 may be performed as one operation.

Method 800 begins at block 810, where a fabricator identifies or defines a region 495 of the photonic platform 120 to remove (as per FIG. 7A). The photonic platform 120 has a first surface 435 and an opposing second surface 445 and includes a dielectric 415 (e.g., SiO$_2$) formed on a base 425 (e.g., a Si wafer). The dielectric 415 includes at least one waveguide 130 and heating element 140 formed within the dielectric 415, and the fabricator defines where the region 495 is positioned relative to the locations of the waveguides 130 and heating elements 140. In various embodiments, the region 495 is defined by an increased susceptibility or reactivity to a chemical etchant by one or more of laser patterning or the patterning and application (or lack thereof) of a photoresist mask to portions of the photonic platform 120.

At block 820, the fabricator forms a trench 450 in the photonic platform 120 by removing portions of the dielectric 415 as defined by the region 495 (as per FIG. 7B). Method 800 may repeat block 810 and block 820 in several rounds of a photolithographic and etching process to define various depths and shapes for the trench 450 before proceeding to block 830. Although shown in the Figures having a generally rectangular cross-sectional shape, the trench 450 may be defined with various cross sectional shapes that vary in size and shape along the length (e.g., in the y-direction) of the photonic platform 120.

At block 830, the fabricator bonds the substrate 110 with a silicon photonic platform 120 (e.g., per FIG. 7C). The substrate 110 includes bulk material 410, and has a first surface 430 to which the first surface 435 of the photonic platform 120 is bonded, and an opposite second surface 440. In various embodiments, the substrate 110 may include a surface layer 420 on the first surface 435 of a dielectric or other material to promote bonding with the photonic platform 120. In various embodiments, the base 425 is removed from the photonic platform 120 before bonding the photonic platform 120 to the substrate 110.

In some embodiments, the fabricator uses an oxide-to-oxide bonding technique, such as plasma assisted bonding, to form a bond between the respective surfaces of the substrate 110 and the photonic platform 120. Additionally or alternatively, a fabricator may use various epoxies, thermocompression, and other bonding techniques to bond the substrate 110 and the photonic platform 120 together. The bonded first surfaces 430/435 assure an airtight seal to maintain the pressure and atmosphere (e.g., gas composition or vacuum) in the cavity 150 at the time of bonding the substrate 110 and photonic platform 120 with one another.

In various embodiments, the fabricator bonds a plurality of photonic platforms 120 with a plurality of substrates 110 in a wafer-to-wafer bonding process where the photonic platforms 120 are defined in dies on a first wafer and the substrates 110 are defined in a corresponding number of dies on a second wafer. When bonding multiple wafers together, the faces of the wafers are aligned with one another so that the respective plurality of dies defined in each wafer mate with one another. By mating a first and a second plurality of dies together that are formed from separate wafers, a fabricator may use different processes and materials (which may be otherwise incompatible with one another) to form the different components and features (e.g., the trench 450) on the substrate 110 and the photonic platform 120. In various embodiments, the faces of the wafers that are to be bonded together include various alignment features (e.g., wafer level alignment features) that are matched with alignment features present on the other wafer. In some embodiments, the alignment features are defined on a face of the wafer in an area not occupied by the dies, but in other embodiments, the dies may include alignment features.

At block 840, a fabricator patterns the photonic platform 120. In some embodiments, the fabricator removes the base 425 to reveal the dielectric 415 as the second surface 445 of the opto-electronic device 100 (e.g., as per FIG. 7D). In some embodiments, the fabricator defines one or more channels 160 (e.g., as per FIG. 7E) from the second surface 445 into the dielectric 415 (e.g., by physical and/or chemical etching) to provide additional thermal isolation elements in the opto-electronic device 100. In yet further embodiments, the fabricator bonds a cap 460 to the second surface 445 of the photonic platform 120 to seal the channels 160 to form additional cavities 150 (e.g., cavities 150b-c in addition to cavity 150a in FIG. 7F).

At block 850, a fabricator finalizes the opto-electronic device 100. In various embodiments, finalizing the opto-electronic device 100 includes dicing individual opto-electronic devices 100 from dies defined on a wafer, polishing and/or applying optical interface coatings to ends of the waveguides 130, forming electrical traces to the heating elements 140, mounting electrical components to the opto-electronic device 100, bonding the opto-electronic device 100 to a sub-mount for inclusion in another assembly, etc. Method 800 may then conclude.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

In view of the foregoing, the scope of the present disclosure is determined by the claims that follow.

I claim:

1. A method, comprising:
forming a trench in a photonic platform; and
bonding the photonic platform to a surface of a substrate to enclose the trench so as to define a cavity between the photonic platform and the surface of the substrate, and
wherein the photonic platform comprises an optical waveguide and a heating element, and wherein the photonic platform is bonded to the substrate so that the photonic platform and the substrate are in a stacked arrangement along a first direction, and wherein both the optical waveguide and the heating element are spaced from the cavity along the first direction.

2. The method of claim 1, wherein the cavity contains a predefined atmosphere at a predefined pressure, and wherein the predefined atmosphere is a gas of known composition.

3. The method of claim 1, wherein the cavity contains vacuum at a predefined pressure.

4. The method of claim 1, further comprising, after bonding the photonic platform to the substrate, etching an air channel from a second surface of the photonic platform, opposite to a first surface of the photonic platform, toward but not reaching the first surface.

5. The method of claim 4, further comprising, after etching the air channel, bonding a cap to the second surface to seal the air channel into a second cavity that contains a second predefined atmosphere at a second predefined pressure.

6. The method of claim 1, wherein the optical waveguide is disposed between the heating element and the cavity along the first direction.

7. The method of claim 1, further comprising:
after bonding the photonic platform to the substrate, etching a first air channel and a second channel in the photonic platform, and wherein the heating element and the optical waveguide are positioned between the first air channel and the second air channel.

8. A method, comprising:
forming a trench in a substrate or a photonic platform;
bonding the substrate to the photonic platform to enclose the trench so as to define a cavity between the photonic platform and the substrate; and
after bonding the photonic platform to the substrate, etching an air channel from a second surface of the photonic platform toward, but not reaching, a first surface of the photonic platform that is bonded to the substrate, the second surface is opposite to the first surface.

9. The method of claim 8, wherein the cavity contains a predefined atmosphere at a predefined pressure, wherein the predefined atmosphere is a gas of known composition.

10. The method of claim 8, wherein the cavity contains vacuum at a predefined pressure.

11. The method of claim 8, wherein the photonic platform further comprises an optical waveguide and a heating element, and wherein the optical waveguide is disposed between the heating element and the cavity.

12. The method of claim 8, further comprising, after etching the air channel, bonding a cap to the second surface to seal the air channel into a second cavity that contains a second predefined atmosphere at a second predefined pressure.

13. The method of claim 8, wherein the substrate includes a dielectric surface layer formed on a first surface through which the trench is produced.

14. A method, comprising:
forming a trench in a first surface of a photonic platform; and
bonding the first surface of the photonic platform to a second surface of a substrate to define a cavity between the trench and the substrate and wherein the cavity is aligned with a first optical waveguide and a first heating element in the photonic platform and between the first optical waveguide and a second heating element in the photonic platform.

15. The method of claim 14, wherein the photonic platform further comprises a second optical waveguide, wherein the first heating element is associated with and aligned with the first optical waveguide and the second heating element is associated with and aligned with the second optical waveguide, wherein the cavity is aligned with the second optical waveguide and the first heating element.

16. The method of claim 14, further comprising:
forming an open channel on a third surface of the photonic platform that is opposite to the first surface, wherein the open channel runs towards, but does not reach the first surface.

17. The method of claim 16, wherein the cavity is aligned vertically with the first optical waveguide and the first heating element such that the first optical waveguide separates the first heating element from the cavity.

18. The method of claim 14, wherein a predefined pressure contained in the cavity is less than 3 kiloPascals.

19. The method of claim 14, wherein a predefined atmosphere contained in the cavity is selected from the group consisting of:
Air;
Nitrogen gas;
Carbon dioxide gas;
Carbon monoxide gas;

Sulfur hexafluoride gas;
Neon gas; and
Argon gas.

20. The method of claim 14, further comprising:
identifying a region on the second surface of the substrate; and
removing the region to produce a second trench in the second surface of the substrate, wherein the trench and the second trench are aligned to define the cavity.

* * * * *